United States Patent
Kamada

(10) Patent No.: US 11,440,346 B2
(45) Date of Patent: Sep. 13, 2022

(54) HUB ASSEMBLY AND DRIVE TRAIN

(71) Applicant: SHIMANO INC., Sakai (JP)

(72) Inventor: Kenji Kamada, Sakai (JP)

(73) Assignee: SHIMANO INC., Sakai (JP)

( * ) Notice: Subject to any disclaimer, the term of this patent is extended or adjusted under 35 U.S.C. 154(b) by 799 days.

(21) Appl. No.: 16/245,256

(22) Filed: Jan. 11, 2019

(65) Prior Publication Data

US 2020/0223255 A1 Jul. 16, 2020

(51) Int. Cl.
| | | |
|---|---|---|
| *B60B 27/02* | (2006.01) | |
| *B62M 11/16* | (2006.01) | |
| *B60B 27/04* | (2006.01) | |
| *B62M 6/55* | (2010.01) | |
| *B62M 11/18* | (2006.01) | |
| *B62M 1/36* | (2013.01) | |

(52) U.S. Cl.
CPC ............ *B60B 27/023* (2013.01); *B60B 27/04* (2013.01); *B62M 1/36* (2013.01); *B62M 6/55* (2013.01); *B62M 11/16* (2013.01); *B62M 11/18* (2013.01)

(58) Field of Classification Search
CPC ...... B60B 27/023; B60B 27/04; B62M 11/16; B62M 6/55; B62M 11/18; B62M 1/36; B62M 9/123
See application file for complete search history.

(56) References Cited

U.S. PATENT DOCUMENTS

| | | | |
|---|---|---|---|
| 6,387,008 B1 * | 5/2002 | Chen ..................... | B62M 11/16 192/43.2 |
| 8,376,897 B2 | 2/2013 | Shoge et al. | |
| 2005/0252750 A1 * | 11/2005 | Matsueda ............. | B62M 11/16 192/217.4 |
| 2007/0254768 A1 * | 11/2007 | Okochi .................... | B62L 5/10 475/298 |
| 2014/0235383 A1 * | 8/2014 | Wesling ................... | B62M 6/55 474/80 |
| 2015/0088389 A1 | 3/2015 | Gao | |

FOREIGN PATENT DOCUMENTS

| | | | | |
|---|---|---|---|---|
| EP | 2204316 A1 * | 7/2010 | ............. | B60L 50/66 |
| JP | 5405219 B2 | 1/2011 | | |

* cited by examiner

*Primary Examiner* — Justin Holmes
(74) *Attorney, Agent, or Firm* — Mori & Ward, LLP

(57) ABSTRACT

A hub assembly for a human-powered vehicle comprises a hub axle, a first rotatable member, a second rotatable member, and a rotation control structure. The rotation control structure couples the first rotatable member to the second rotatable member to transmit a first input rotation of the first rotatable member to the second rotatable member at a first ratio of a first output rotation of the second rotatable member to the first input rotation of the first rotatable member. The rotation control structure couples the second rotatable member to the first rotatable member to transmit a second input rotation of the second rotatable member to the first rotatable member at a second ratio of a second output rotation of the first rotatable member to the second input rotation of the second rotatable member. The second ratio is different from the first ratio. The second ratio is larger than 0.

20 Claims, 23 Drawing Sheets

HUB ASSEMBLY AND DRIVE TRAIN

BACKGROUND OF THE INVENTION

Field of the Invention

The present invention relates to a hub assembly and a drive train.

Discussion of the Background

A human-powered vehicle includes a structure configured to transmit a human power to a rotational member.

SUMMARY OF THE INVENTION

In accordance with a first aspect of the present invention, a hub assembly for a human-powered vehicle comprises a hub axle, a first rotatable member, a second rotatable member, and a rotation control structure. The first rotatable member is rotatable relative to the hub axle about a rotational center axis. The first rotatable member includes a sprocket engagement structure configured to engage with a plurality of sprockets. The second rotatable member is rotatable relative to the hub axle and the first rotatable member about the rotational center axis. The rotation control structure couples the first rotatable member to the second rotatable member to transmit a first input rotation of the first rotatable member to the second rotatable member at a first ratio of a first output rotation of the second rotatable member to the first input rotation of the first rotatable member. The rotation control structure couples the second rotatable member to the first rotatable member to transmit a second input rotation of the second rotatable member to the first rotatable member at a second ratio of a second output rotation of the first rotatable member to the second input rotation of the second rotatable member. The second ratio is different from the first ratio. The second ratio is larger than 0.

With the hub assembly according to the first aspect, the rotation control structure can rotate the first rotatable member relative to the hub axle at a rotational speed which is different from a rotational speed of the second rotatable member. Thus, it is possible to shift a chain engaged with one of the plurality of sprockets to another of the plurality of sprockets during coasting.

In accordance with a second aspect of the present invention, the hub assembly according to the first aspect is configured so that the second ratio is smaller than 1.

With the hub assembly according to the second aspect, the rotation control structure can reduce the second output rotation of the first rotatable member from the second input rotation of the second rotatable member. Thus, the rotation control structure can rotate the plurality of sprockets relative to the hub axle during coasting at a rotational speed lower than the rotational speed of the second rotatable member. Accordingly, it is possible to shift the chain engaged with one of the plurality of sprockets to another of the plurality of sprockets during coasting while the chain rotates at a lower rotational speed.

In accordance with a third aspect of the present invention, a hub assembly for a human-powered vehicle comprises a hub axle, a first rotatable member, a second rotatable member, and a rotation control structure. The first rotatable member is rotatable relative to the hub axle about a rotational center axis. The second rotatable member is rotatable relative to the hub axle and the first rotatable member about the rotational center axis. The rotation control structure couples the first rotatable member to the second rotatable member to transmit a first input rotation of the first rotatable member to the second rotatable member at a first ratio of a first output rotation of the second rotatable member to the first input rotation of the first rotatable member. The rotation control structure couples the second rotatable member to the first rotatable member to transmit a second input rotation of the second rotatable member to the first rotatable member at a second ratio of a second output rotation of the first rotatable member to the second input rotation of the second rotatable member. The second ratio is larger than 0. The second ratio is smaller than 1.

With the hub assembly according to the third aspect, the rotation control structure can reduce the second output rotation of the first rotatable member from the second input rotation of the second rotatable member. Thus, the rotation control structure can rotate the first rotatable member relative to the hub axle during coasting at a rotational speed which is lower than a rotational speed of the second rotatable member.

In accordance with a fourth aspect of the present invention, the hub assembly according to any one of the first to third aspects is configured so that the first ratio is 1.

With the hub assembly according to the fourth aspect, the rotation control structure can transmit the first input rotation of the first rotatable member to the second rotatable member without reducing the first input rotation. Thus, it is possible to effectively transmit the first input rotation of the first rotatable member to the second rotatable member.

In accordance with a fifth aspect of the present invention, the hub assembly according to any one of the first to fourth aspects is configured so that the rotation control structure includes a first one-way clutch provided between the first rotatable member and the second rotatable member to transmit the first input rotation of the first rotatable member to the second rotatable member at the first ratio.

With the hub assembly according to the fifth aspect, it is possible to transmit the first input rotation of the first rotatable member to the second rotatable member at the first ratio with a simple structure.

In accordance with a sixth aspect of the present invention, the hub assembly according to the fifth aspect is configured so that the first one-way clutch is provided between the first rotatable member and the second rotatable member to restrict the first rotatable member to rotate relative to the second rotatable member about the rotational center axis in a first rotational direction. The first one-way clutch is provided between the first rotatable member and the second rotatable member to allow the first rotatable member to rotate relative to the second rotatable member about the rotational center axis in a second rotational direction which is an opposite direction of the first rotational direction.

With the hub assembly according to the sixth aspect, it is possible to transmit the first input rotation of the first rotatable member to the second rotatable member at the first ratio with a simple structure.

In accordance with a seventh aspect of the present invention, the hub assembly according to the fifth or sixth aspect is configured so that the first one-way clutch includes a first receiving surface and a first contactable surface. The first receiving surface is provided at one of the first rotatable member and the second rotatable member. The first contactable surface is configured to contact the first receiving surface to transmit the first input rotation of the first rotatable member to the second rotatable member at the first ratio.

With the hub assembly according to the seventh aspect, it is possible to transmit the first input rotation of the first rotatable member to the second rotatable member at the first ratio with a simple structure.

In accordance with an eighth aspect of the present invention, the hub assembly according to any one of the first to seventh aspects is configured so that the rotation control structure includes a ring gear, a sun gear, and at least one planetary gear engaged with the ring gear and the sun gear to transmit the second input rotation of the second rotatable member to the first rotatable member at the second ratio.

With the hub assembly according to the eighth aspect, it is possible to transmit the second input rotation of the second rotatable member to the first rotatable member at the second ratio with a simple structure.

In accordance with a ninth aspect of the present invention, the hub assembly according to the eighth aspect is configured so that the ring gear is rotatable relative to the hub axle, the first rotatable member, and the second rotatable member about the rotational center axis. The sun gear is coupled to the second rotatable member to rotate along with the second rotatable member relative to the hub axle and the first rotatable member. The at least one planetary gear is provided between the sun gear and the ring gear to transmit a rotation of the ring gear to the sun gear at the second ratio.

With the hub assembly according to the ninth aspect, it is possible to transmit the second input rotation of the second rotatable member to the first rotatable member at the second ratio with a simple structure.

In accordance with a tenth aspect of the present invention, the hub assembly according to the ninth aspect is configured so that the rotation control structure includes a second one-way clutch provided between the hub axle and the ring gear to allow the ring gear to rotate relative to the hub axle in a first rotational direction and to restrict the ring gear from rotating relative to the hub axle about the rotational center axis in a second rotational direction which is an opposite direction of the first rotational direction.

With the hub assembly according to the tenth aspect, it is possible to reliably transmit the second input rotation of the second rotatable member to the first rotatable member at the second ratio with a simple structure.

In accordance with an eleventh aspect of the present invention, the hub assembly according to the tenth aspect is configured so that the second one-way clutch includes a second receiving surface and a second contactable surface. The second receiving surface is provided at one of the hub axle and the ring gear. The second contactable surface is configured to contact the second receiving surface to restrict the ring gear from rotating relative to the hub axle about the rotational center axis in the second rotational direction.

With the hub assembly according to the eleventh aspect, it is possible to reliably transmit the second input rotation of the second rotatable member to the first rotatable member at the second ratio with a simple structure.

In accordance with a twelfth aspect of the present invention, the hub assembly according to any one of the eighth to eleventh aspects is configured so that the at least one planetary gear is rotatably coupled to the first rotatable member.

With the hub assembly according to the twelfth aspect, it is possible to rotatably support the at least one planetary gear relative to the first rotatable member.

In accordance with a thirteenth aspect of the present invention, the hub assembly according to any one of the first to twelfth aspects is configured so that the second ratio is smaller than 0.5.

With the hub assembly according to the thirteenth aspect, it is possible to shift the chain engaged with one of the plurality of sprockets to another of the plurality of sprockets during coasting while the chain rotates at a lower rotational speed.

In accordance with a fourteenth aspect of the present invention, the hub assembly according to any one of the first to thirteenth aspects is configured so that the first input rotation of the first rotatable member includes a rotation of the first rotatable member relative to the hub axle about the rotational center axis in a first rotational direction. The first output rotation of the second rotatable member includes a rotation of the second rotatable member relative to the hub axle about the rotational center axis in the first rotational direction.

With the hub assembly according to the fourteenth aspect, it is possible to effectively transmit the first input rotation of the first rotatable member to the second rotatable member.

In accordance with a fifteenth aspect of the present invention, the hub assembly according to the fourteenth aspect is configured so that the second input rotation of the second rotatable member includes a rotation of the second rotatable member relative to the hub axle about the rotational center axis in the first rotational direction. The second output rotation of the first rotatable member includes a rotation of the second rotatable member relative to the hub axle about the rotational center axis in the first rotational direction.

With the hub assembly according to the fifteenth aspect, it is possible to effectively transmit the second input rotation of the second rotatable member to the first rotatable member.

In accordance with a sixteenth aspect of the present invention, a drive train for a human-powered vehicle comprises the hub assembly according to any one of the first to fifteenth aspects, a plurality of sprockets mounted to the first rotatable member, and a crank assembly. The crank assembly comprises a crank, an additional sprocket, and an additional one-way clutch. The additional sprocket is rotatable relative to the crank. The additional one-way clutch is provided between the crank and the additional sprocket to restrict the crank from rotating relative to the additional sprocket in a first crank-rotational direction and to allow the crank to rotate relative to the additional sprocket in a second crank-rotational direction which is an opposite direction of the first crank-rotational direction.

With the drive train according to the sixteenth aspect, the rotation control structure can rotate the first rotatable member relative to the hub axle at a rotational speed which is different from a rotational speed of the second rotatable member. Thus, it is possible to shift a chain engaged with one of the plurality of sprockets to another of the plurality of sprockets during coasting.

In accordance with a seventeenth aspect of the present invention, the drive train according to the sixteenth aspect further comprises a gear shifting device configured to shift a chain relative to the plurality of sprockets. The gear shifting device includes a chain guide, an actuator, and a controller. The chain guide is configured to support the chain. The actuator is configured to move the chain guide relative to the plurality of sprockets. The controller is configured to control the actuator to move the chain guide based on vehicle information relating to the human-powered vehicle.

With the drive train according to the seventeenth aspect, it is possible to automatically change a gear position of the gear shifting device during coasting based on the vehicle information during coasting since the rotation control structure can rotate the first rotatable member relative to the hub axle during coasting.

In accordance with an eighteenth aspect of the present invention, the drive train according to the seventeenth aspect is configured so that the vehicle information includes a cadence indicating a rotational speed of the crank. The controller is configured to control the actuator to move the chain guide based on the cadence.

With the drive train according to the eighteenth aspect, it is possible to automatically change a gear position of the gear shifting device during coasting based on the cadence during coasting since the rotation control structure can rotate the first rotatable member relative to the hub axle during coasting.

In accordance with a nineteenth aspect of the present invention, the drive train according to any one of the sixteenth to eighteenth aspects further comprises a drive unit configured to generate an assist force to rotate the hub assembly.

With the drive train according to the nineteenth aspect, it is possible to assist pedaling using the drive unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
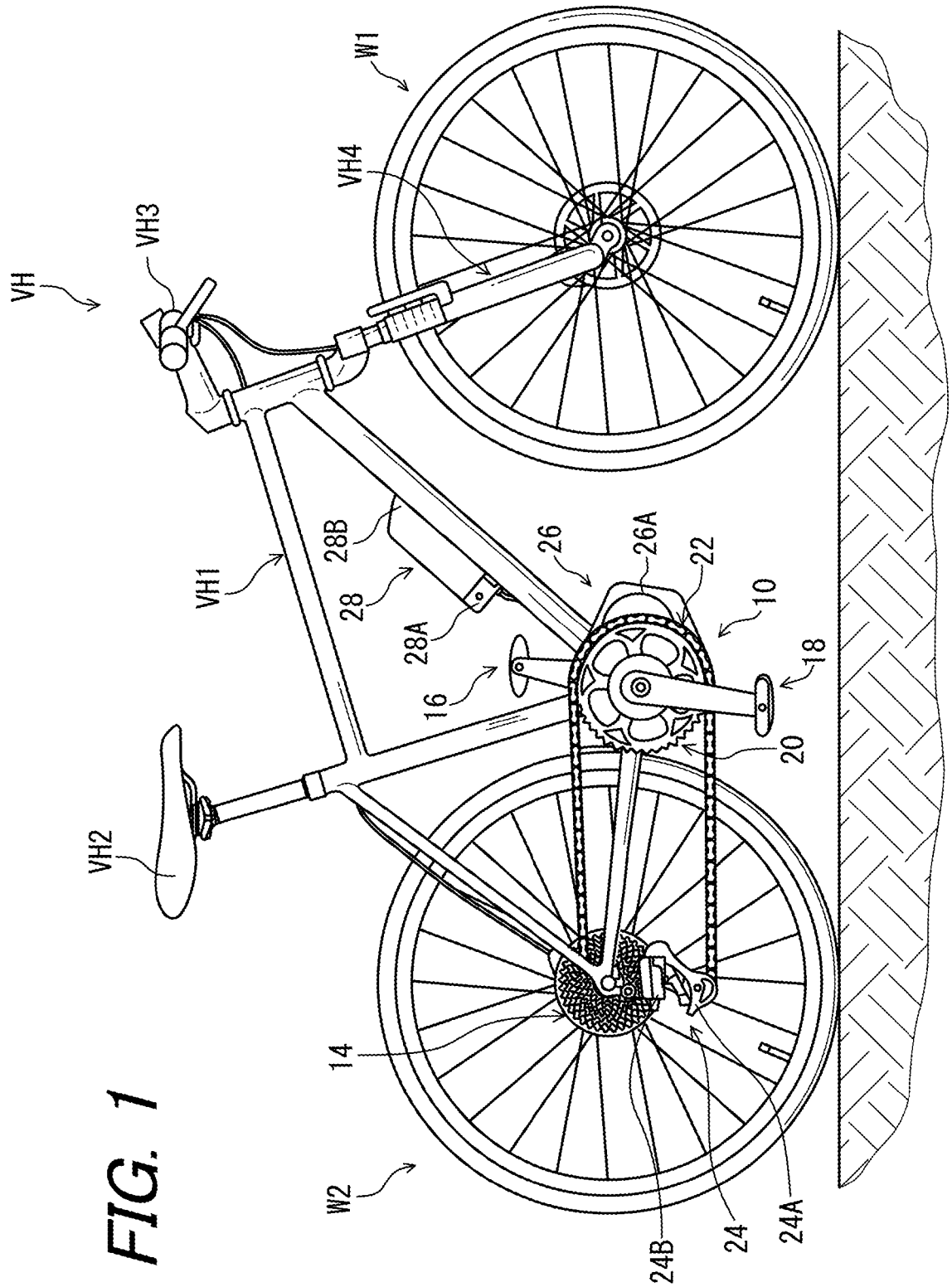
FIG. 1 is a side elevational view of a human-powered vehicle including a drive train in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes a drive train 10 in accordance with a first embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. For example, the human-powered vehicle VH can have a larger size than that of the four-wheeled automobile. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the drive train 10 can be applied to mountain bikes or any type of human-powered vehicles.

The human-powered vehicle VH further includes a vehicle frame VH1, a saddle VH2, a handlebar VH3, a front fork VH4, and wheels W1 and W2. The saddle VH2 and the handlebar VH3 are coupled to the vehicle frame VH1. The front fork VH4 is secured to the handlebar Vh3. The wheel W1 is rotatable coupled to the front fork VH4. The wheel W2 is rotatably coupled to the vehicle frame VH1.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle VH2 of the human-powered vehicle VH with facing the handlebar VH3. Accordingly, these terms, as utilized to describe the drive train 10 or other components, should be interpreted relative to the human-powered vehicle VH equipped with the drive train 10 as used in an upright riding position on a horizontal surface.

Figure 2:
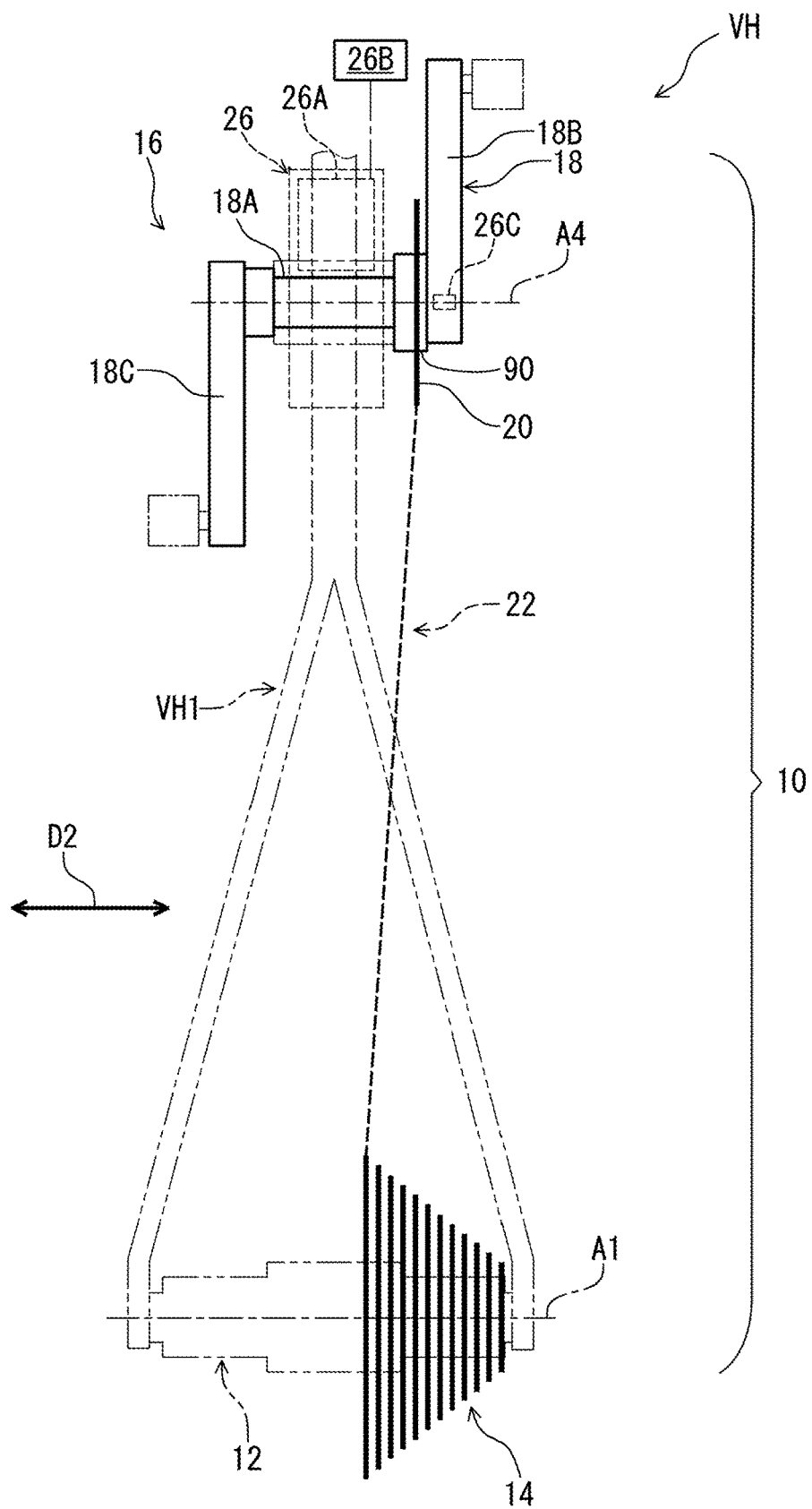
FIG. 2 is a schematic diagram of the drive train of the human-powered vehicle illustrated in FIG. 1.

As seen in FIG. 2, the drive train 10 for the human-powered vehicle VH comprises a hub assembly 12, a plurality of sprockets 14, and a crank assembly 16. The plurality of sprockets 14 is mounted to the hub assembly 12. The crank assembly 16 comprises a crank 18 and an additional sprocket 20. The crank 18 includes a crank axle 18A and crank arms 18B and 18C. The crank arms 18B and 18C are secured to the crank axle 18A. The additional sprocket 20 is mounted to the crank 18. The drive train 10 includes a chain 22. The chain 22 is engaged with the additional sprocket 20 and one of the plurality of sprockets 14 to transmit a rotational force from the additional sprocket 20 to the one of the plurality of sprockets 14.

As seen in FIG. 1, the drive train 10 further comprises a gear shifting device 24 configured to shift the chain 22 relative to the plurality of sprockets 14. The gear shifting device 24 includes a chain guide 24A and an actuator 24B. The chain guide 24A is configured to support the chain 22. The actuator 24B is configured to move the chain guide 24A relative to the plurality of sprockets 14. Thus, the actuator 24B is configured to move the chain 22 relative to the plurality of sprockets 14 to change a gear position on the drive train 10.

The drive train 10 further comprises a drive unit 26 configured to generate an assist force to rotate the hub assembly 12. The drive unit 26 is configured to apply the assist force to the additional sprocket 20 based on the human power which is input to the crank 18. The drive unit 26 includes an assist motor 26A. The assist motor 26A is coupled to the crank 18 to apply the assist force to the additional sprocket 20 directly or indirectly through the crank 18.

As seen in FIG. 2, the drive unit 26 includes an assist controller 26B and a human-power sensor 26C. The assist controller 26B is configured to control the assist motor 26A to generate the assist force based on a human power which is input to the crank 18. The human-power sensor 26C is configured to sense the human power which is input to the crank 18. The assist controller 26B is configured to control the assist motor 26A to generate the assist force based on the human power which is sensed by the human-power sensor 26C. Since the assist controller 26B and the human-power sensor 26C include structures and/or configurations which have been known, it will not be described in detail here for the sake of brevity.

As seen in FIG. 1, the drive train 10 comprises a power supply 28 configured to supply electricity to the drive unit 26. The power supply 28 includes a battery holder 28A and a battery 28B. The battery holder 28A is electrically connected to the drive unit 26. The battery 28B is detachably attached to the battery holder 28A to supply electricity to the drive unit 26 through the battery holder 28A.

Figure 3:
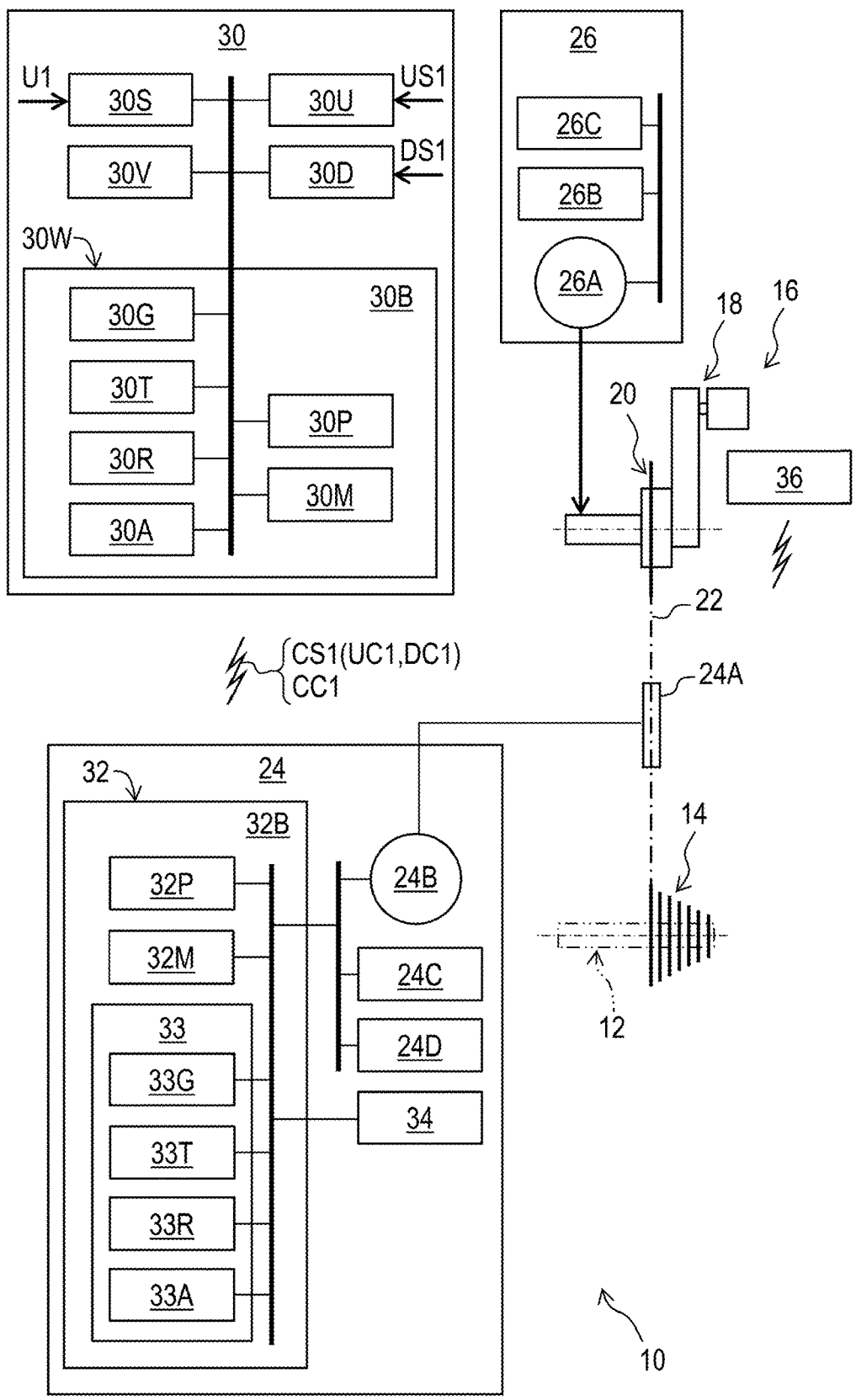
FIG. 3 is a schematic block diagram of the drive train of the human-powered vehicle illustrated in FIG. 1.

As seen in FIG. 3, the human-powered vehicle VH includes an operating device 30. The operating device 30 includes an upshift switch 30U, a downshift switch 30D, and a wireless communicator 30W. The upshift switch 30U is configured to receive a user upshift input US1. The downshift switch 30D is configured to receive a user downshift input DS1. The wireless communicator 30W is configured to wirelessly transmit an upshift control signal UC1 in response to the user upshift input US1 received by the upshift switch 30U. The wireless communicator 30W is configured to generate a downshift control signal DC1 in response to the user downshift input DS1 received by the downshift switch 30D.

In this embodiment, the wireless communicator 30W includes a processor 30P, a memory 30M, and a circuit board 30B. The processor 30P and the memory 30M are electrically mounted on the circuit board 30B. The processor 30P includes a central processing unit (CPU) and a memory controller. The memory 30M is connected to the processor 30P. The memory 30M includes a read only memory (ROM) and a random-access memory (RAM). The ROM includes a non-transitory computer-readable storage medium. The RAM includes a transitory computer-readable storage medium. The memory 30M includes storage areas each having an address in the ROM and the RAM. The processor 30P controls the memory 30M to store data in the storage areas of the memory 30M and reads data from the storage areas of the memory 30M. The memory 30M (e.g., the ROM) stores a program. The program is read into the processor 30P, and thereby algorithms of the wireless communicator 30W.

The wireless communicator 30W includes a signal generating circuit 30G, a signal transmitting circuit 30T, a signal receiving circuit 30R, and an antenna 30A. The signal generating circuit 30G generates wireless signals (e.g., a shift control signal CS1 such as the upshift control signal UC1 or the downshift control signal DC1) based on each of the user upshift input US1 and the user downshift input DS1 received by the upshift and downshift switches 30U and 30D of the operating device 30. The signal generating circuit 30G superimposes digital signals on carrier wave using a predetermined wireless communication protocol to generate the wireless signals. The signal transmitting circuit 30T transmits the wireless signal via the antenna 30A in response to the electric signal which is input from each of the upshift and downshift switches 30U and 30D. In this embodiment, the signal generating circuit 30G can encrypt control information to generate encrypted wireless signals. The signal generating circuit 30G encrypts digital signals stored in the memory 30M using a cryptographic key. The signal transmitting circuit 30T transmits the encrypted wireless signals. Thus, the wireless communicator 30W wirelessly transmits the wireless signal to establish wireless communication.

Further, the signal receiving circuit 30R receives a wireless signal from the additional wireless communication device via the antenna 30A. In this embodiment, the signal receiving circuit 30R decodes the wireless signal to recognize information wirelessly transmitted from the additional wireless communication device. The signal receiving circuit 30R may decrypt the encrypted wireless signal using the cryptographic key. Namely, the wireless communicator 30W is configured to transmit a wireless signal to control an additional electrical component and to receive a wireless signal to recognize information from the additional electrical component. In other words, the wireless communicator 30W is provided as a wireless transmitter and a wireless receiver. In this embodiment, the wireless communicator 30W is integrally provided as a single unit. However, the wireless communicator 30W can be constituted of a wireless transmitter and a wireless receiver which are provided as separate units arranged at different positions from each other.

The operating device 30 further includes a mode switch 30S. The mode switch 30S is configured to change a mode of the gear shifting device 24 between a manual shift mode and an automatic shift mode in response to a user input U1. The wireless communicator 30W is configured to wirelessly transmit a mode-change signal CC1 indicating one of the manual shift mode and the automatic shift mode.

The operating device 30 further comprises a power supply 30V. The power supply 30V is electrically connected to the wireless communicator 30W to supply electricity to the wireless communicator 30W. Examples of the power supply 30V include a battery and a piezoelectric device generating power in response to the operation of one of the upshift and downshift switches 30U and 30D.

As seen in FIG. 3, the gear shifting device 24 includes a controller 32. The controller 32 is configured to control the actuator 24B to move the chain guide 24A relative to the plurality of sprockets 14 in response to the shift control signal CS1 (e.g., the upshift control signal UC1 or the downshift control signal DC1). The controller 32 is configured to control the actuator 24B to move the chain guide 24A in an upshifting direction in response to the upshift control signal UC1. The controller 32 is configured to control the actuator 24B to move the chain guide 24A in a downshifting direction in response to the downshift control signal DC1.

In this embodiment, the controller 32 includes a processor 32P, a memory 32M, and a circuit board 32B. The processor 32P and the memory 32M are electrically mounted on the circuit board 32B. The processor 32P includes a CPU and a memory controller. The memory 32M is connected to the processor 32P. The memory 32M includes a ROM and a RAM. The ROM includes a non-transitory computer-readable storage medium. The RAM includes a transitory computer-readable storage medium. The memory 32M includes storage areas each having an address in the ROM and the RAM. The processor 32P controls the memory 32M to store data in the storage areas of the memory 32M and reads data from the storage areas of the memory 32M. The memory 32M (e.g., the ROM) stores a program. The program is read into the processor 32P, and thereby algorithms of the controller 32.

The gear shifting device 24 further includes a wireless communicator 33. The wireless communicator 33 is configured to wirelessly communicate with the wireless communicator 30W of the operating device 30. In this embodiment, the wireless communicator 33 is configured to wirelessly receive the shift control signal CS1 to change a gear position of the gear shifting device 24 from the wireless communicator 30W of the operating device 30.

The wireless communicator 33 includes a signal generating circuit 33G, a signal transmitting circuit 33T, a signal receiving circuit 33R, and an antenna 33A. The signal generating circuit 33G generates wireless signals based on commands generated by the controller 32. The signal generating circuit 33G superimposes digital signals on carrier wave using a predetermined wireless communication protocol to generate the wireless signals. The signal transmitting circuit 33T transmits the wireless signal via the antenna 33A in response to the commands generated by the controller 32. In this embodiment, the signal generating circuit 33G can encrypt control information (e.g., shift information) to generate encrypted wireless signals. The signal generating circuit 33G encrypts digital signals stored in the memory 32M using a cryptographic key. The signal transmitting circuit 33T transmits the encrypted wireless signals. Thus, the wireless communicator 33 wirelessly transmits the wireless signal to establish wireless communication.

Further, the signal receiving circuit 33R receives wireless signals (e.g., the shift control signal CS1) from the operating device 30 via the antenna 33A. In this embodiment, the signal receiving circuit 33R decodes the wireless signal to recognize information wirelessly transmitted from the operating device 30. The signal receiving circuit 33R may decrypt the encrypted wireless signal using the cryptographic key. Namely, the wireless communicator 33 is configured to transmit a wireless signal to control an additional electrical component and to receive a wireless signal to recognize information from the additional electrical component. In other words, the wireless communicator 33 is provided as a wireless transmitter and a wireless receiver. In this embodiment, the controller 32 and the wireless communicator 33 are integrally provided as a single unit. However, the controller 32 and the wireless communicator 33 can be constituted of a wireless transmitter and a wireless receiver which are provided as separate units arranged at different positions from each other.

As seen in FIG. 3, the gear shifting device 24 includes a position sensor 24C and a actuator driver 24D. The actuator 24B, the position sensor 24C, and the actuator driver 24D are electrically connected to each other. In this embodiment, the actuator 24B includes a direct-current (DC) motor. The actuator 24B includes a rotational shaft (not shown) to output a rotational force. The rotational shaft is coupled to the chain guide 24A via a gear reducer (not shown). Other examples of the actuator 24B include a stepper motor and an alternating-current (AC) motor.

The position sensor 24C is configured to sense a position of the actuator 24B as the gear position of the gear shifting device 24. In this embodiment, the position sensor 24C is a contact rotational position sensor such as a potentiometer. The position sensor 24C is configured to sense an absolute rotational position of the rotational shaft of the actuator 24B as the gear position of the gear shifting device 24. Other examples of the position sensor 24C include a non-contact rotational position sensor such as an optical sensor (e.g., a rotary encoder) and a magnetic sensor (e.g., a hall sensor).

The position sensor 24C is electrically connected to the actuator driver 24D. The actuator driver 24D is configured to control the actuator 24B based on the rear gear position sensed by the position sensor 24C. Specifically, the actuator driver 24D is electrically connected to the actuator 24B. The actuator driver 24D is configured to control a rotational direction and a rotational speed of the rotational shaft based on the gear position and each of the upshift control signal UC1 and the downshift control signal DC1. Furthermore, the actuator driver 24D is configured to stop rotation of the rotational shaft to position the chain guide 24A at one of the low to top gear positions based on the gear position and each of the upshift control signal UC1 and the downshift control signal DC1.

The gear shifting device 24 includes a power supply 34. The power supply 34 is configured to supply electricity to the controller 32, the actuator 24B, the position sensor 24C, and the actuator driver 24D. The power supply 34 has substantially the same structure as the structure of the power supply 28. Thus, it will not be described in detail here for the sake of brevity.

The controller 32 has the manual shift mode and the automatic shift mode. The controller 32 is configured to alternately change the mode of the controller 32 between the manual shift mode and the automatic shift mode in response to the mode-change signal CC1 wirelessly transmitted from the operating device 30. In the manual shift mode, the controller 32 is configured to control the actuator 24B to move the chain guide 24A in response to the shift control signal CS1. In the automatic shift mode, the controller 32 is configured to control the actuator 24B to move the chain guide 24A based on vehicle information relating to the human-powered vehicle VH. The vehicle information includes a cadence indicating a rotational speed of the crank 18. The controller 32 is configured to control the actuator 24B to move the chain guide 24A based on the cadence. The controller 32 is configured to control the actuator 24B to move the chain guide 24A to a target gear position in the upshifting direction if the cadence is higher than an upper threshold cadence. The controller 32 is configured to control the actuator 24B to move the chain guide 24A to a target gear position in the downshifting direction if the cadence is lower than a lower threshold cadence.

The drive train 10 includes a cadence sensor 36 configured to sense a rotational speed of the crank 18. The cadence sensor 36 is attached to the vehicle frame VH1 (FIG. 1). The cadence sensor 36 includes a wireless communicator configured to wirelessly transmit a sensed cadence to another wireless communicator such as the wireless communicator 33. In the automatic shift mode, the controller 32 is configured to control the actuator 24B to move the chain guide 24A based on the cadence wirelessly transmitted from the cadence sensor 36. The controller 32 can be configured to use other information such as a rotational speed of the wheel W1 and/or W2 (FIG. 1).

Figure 4:
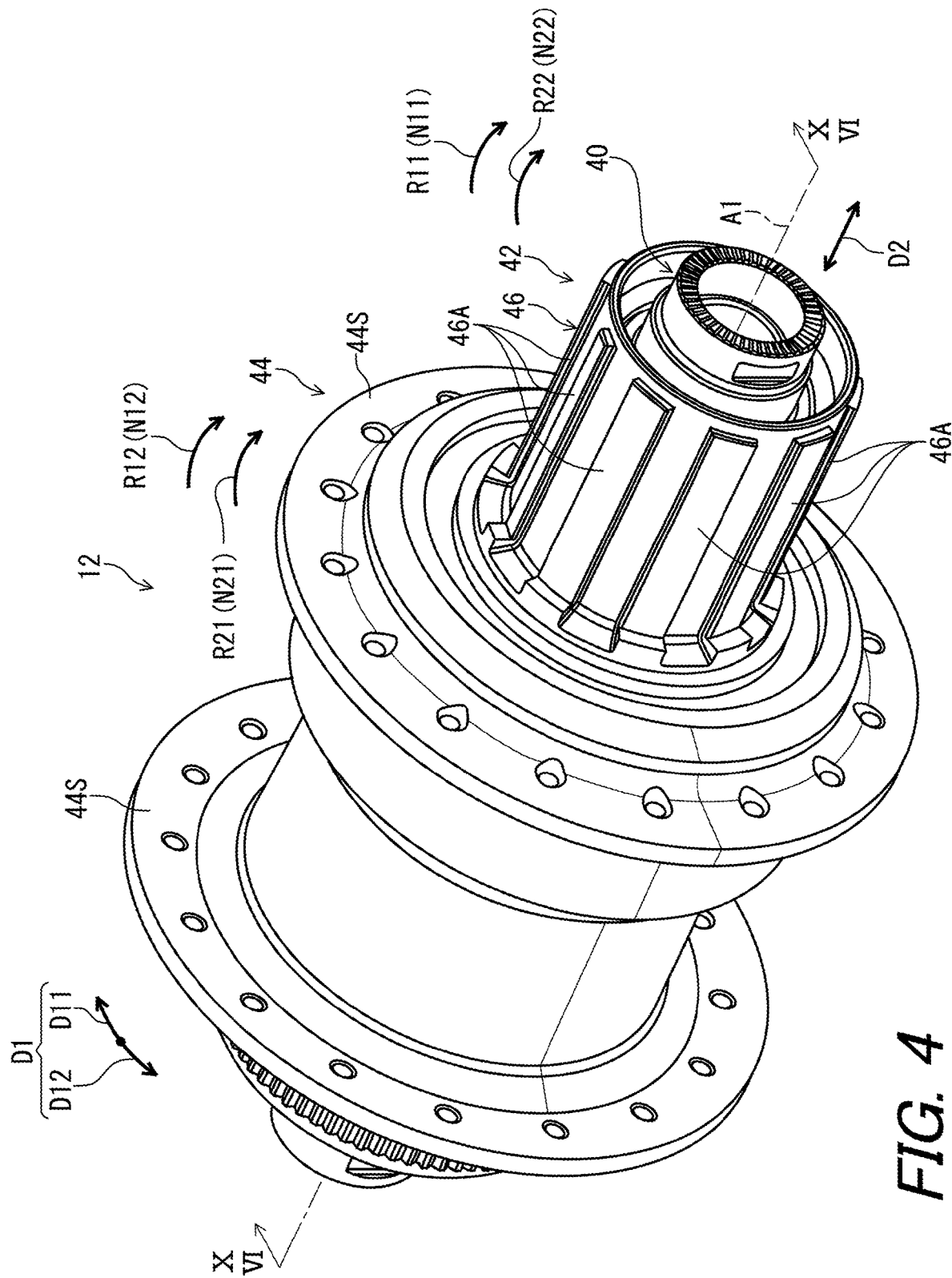
FIG. 4 is a perspective view of a hub assembly of the drive train of the human-powered vehicle illustrated in FIG. 1.

As seen in FIG. 4, the hub assembly 12 for the human-powered vehicle VH comprises a hub axle 40, a first rotatable member 42, and a second rotatable member 44. The first rotatable member 42 is rotatable relative to the hub axle 40 about a rotational center axis A1. The second rotatable member 44 is rotatable relative to the hub axle 40 and the first rotatable member 42 about the rotational center axis A1.

Figure 5:
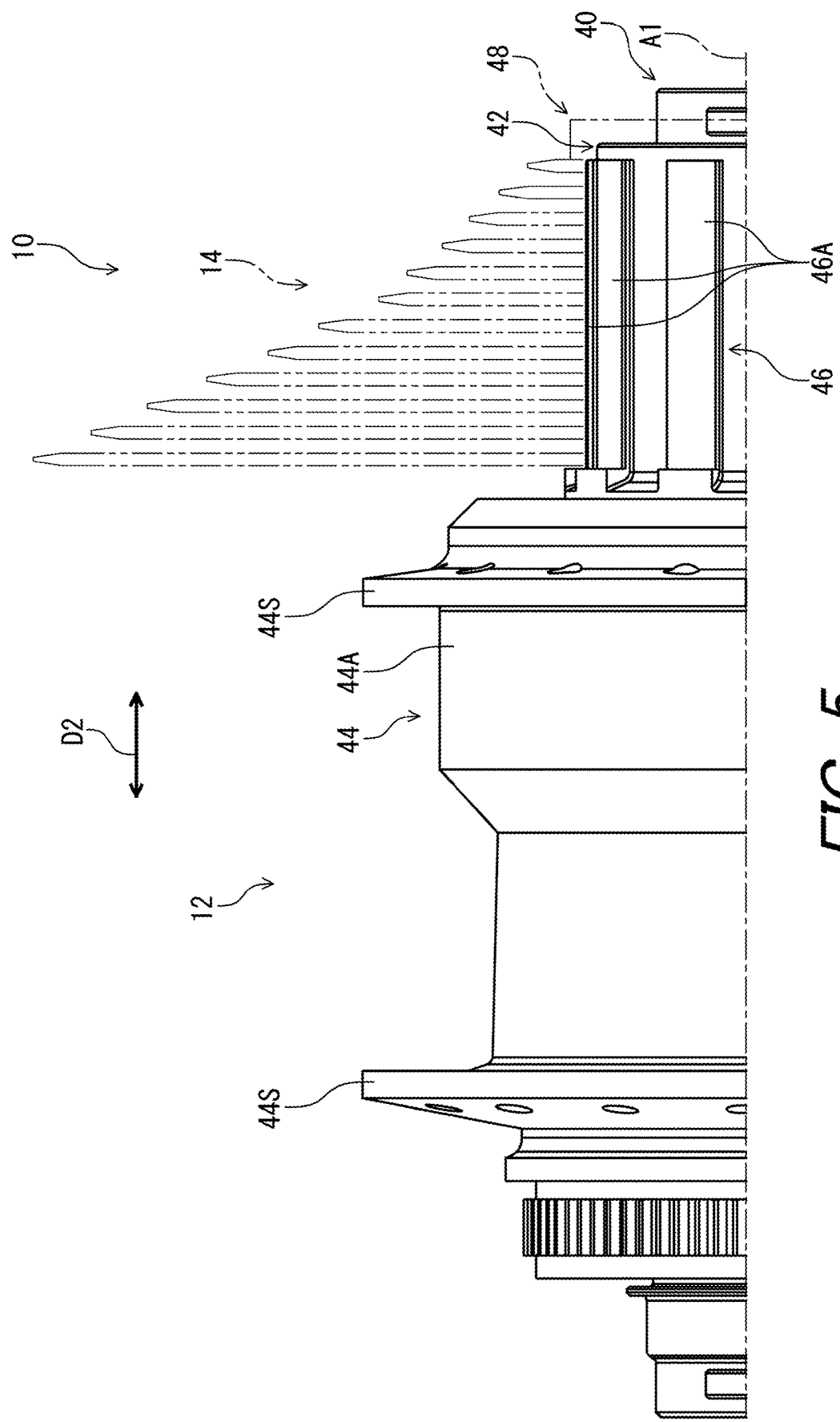
FIG. 5 is a partial rear view of the hub assembly illustrated in FIG. 4.

As seen in FIG. 5, the first rotatable member 42 includes a sprocket engagement structure 46 configured to engage with the plurality of sprockets 14. The plurality of sprockets 14 is mounted to the first rotatable member 42. In this embodiment, the sprocket engagement structure 46 includes a plurality of external spline teeth 46A to mesh with internal sprocket teeth of the plurality of sprockets 14. The plurality of sprockets 14 is secured to the first rotatable member 42 with a lock member 48. The second rotatable member 44 includes spoke connection parts 44S. Spokes of the wheel W2 (FIG. 1) are connected to the spoke connection parts 44S.

Figure 6:
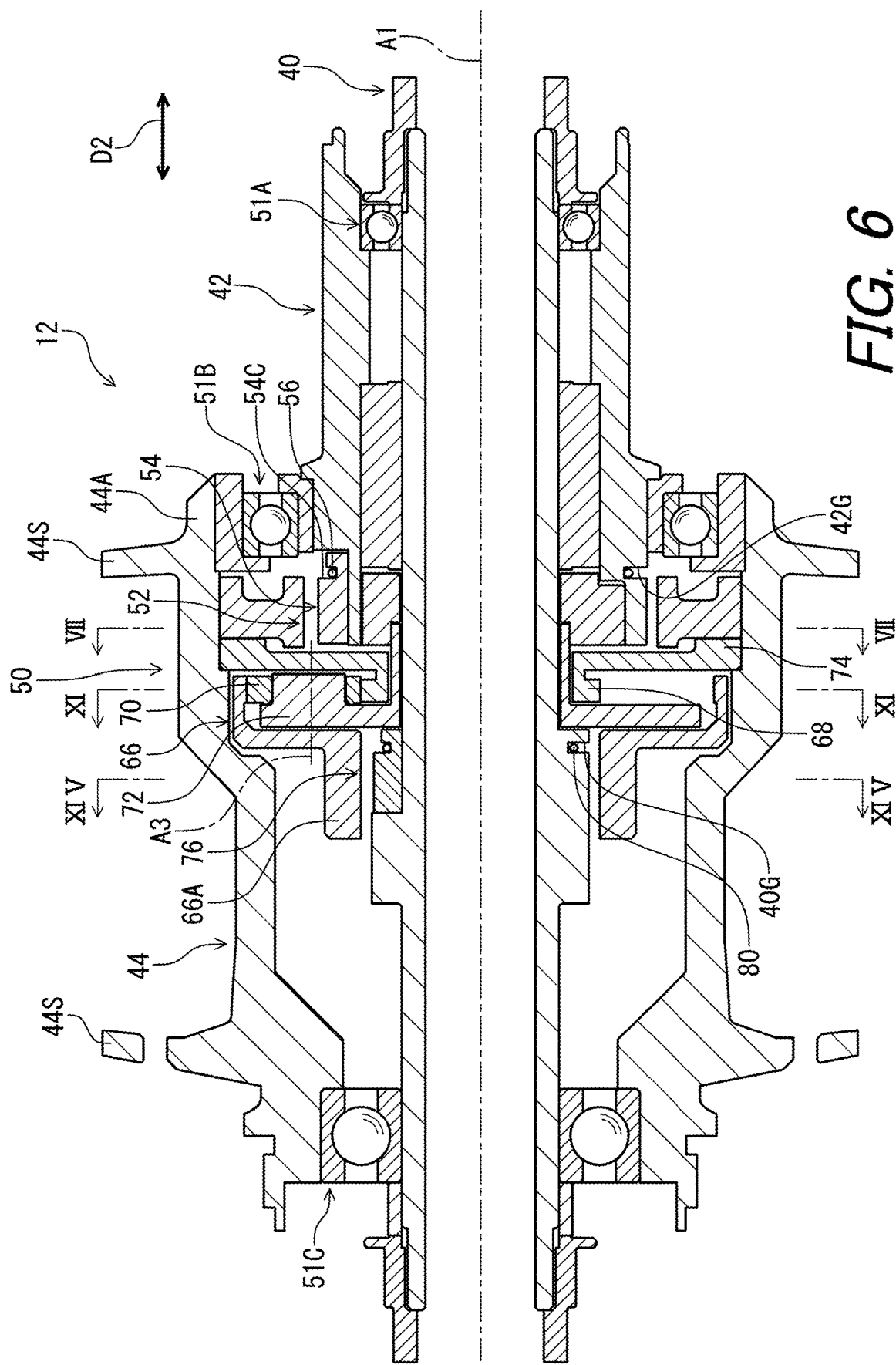
FIG. 6 is a cross-sectional view of the hub assembly taken along line VI-VI of FIG. 4.

As seen in FIG. 6, the hub assembly 12 for the human-powered vehicle VH comprises a rotation control structure 50. The rotation control structure 50 couples the first rotatable member 42 to the second rotatable member 44 to transmit a first input rotation R11 (FIG. 4) of the first rotatable member 42 to the second rotatable member 44 at a first ratio of a first output rotation R12 (FIG. 4) of the second rotatable member 44 to the first input rotation R11 of the first rotatable member 42. The rotation control structure 50 couples the second rotatable member 44 to the first rotatable member 42 to transmit a second input rotation R21 (FIG. 4) of the second rotatable member 44 to the first rotatable member 42 at a second ratio of a second output rotation R22 (FIG. 4) of the first rotatable member 42 to the second input rotation R21 of the second rotatable member 44.

As seen in FIG. 4, the first input rotation R11 of the first rotatable member 42 includes a rotation of the first rotatable member 42 relative to the hub axle 40 about the rotational center axis A1 in a first rotational direction D11. The first output rotation R12 of the second rotatable member 44 includes a rotation of the second rotatable member 44 relative to the hub axle 40 about the rotational center axis A1 in the first rotational direction D11. The second input rotation R21 of the second rotatable member 44 includes a rotation of the second rotatable member 44 relative to the hub axle 40 about the rotational center axis A1 in the first rotational direction D11. The second output rotation R22 of the first rotatable member 42 includes a rotation of the second rotatable member 44 relative to the hub axle 40 about the rotational center axis A1 in the first rotational direction D11.

In this embodiment, the first input rotation R11 of the first rotatable member 42 indicates a rotational speed or rotational frequency N11 of the first rotatable member 42 during pedaling. The first output rotation R12 of the second rotatable member 44 indicates a rotational speed or rotational frequency N12 of the second rotatable member 44 during pedaling. The second input rotation R21 of the second rotatable member 44 indicates a rotational speed or rotational frequency N21 of the second rotatable member 44 during coasting. The second output rotation R22 of the first rotatable member 42 indicates a rotational speed or rotational frequency N22 of the first rotatable member 42 during coasting. Thus, the first ratio is defined as a ratio N12/N11. The second ratio is defined as a ratio N22/N21.

The second ratio is different from the first ratio. The second ratio is smaller than the first ratio. The first ratio is 1. The second ratio is larger than 0. The second ratio is smaller than 1. The second ratio is smaller than 0.5. The second ratio is 0.25. However, the first ratio and the second ratio are not limited to this embodiment and the above ranges. The first ratio can be different from 1. The second ratio can be equal to or larger than 1. The second ratio can be equal to or larger than 0.5. In addition, the first ratio is different from a reciprocal number of the second ratio. Namely, a ratio N12/N11 (during pedaling) is different from a ratio N21/N22 (during coasting).

As seen in FIG. 6, the hub assembly 12 includes a first bearing structure 51A, a second bearing structure 51B, and a third bearing structure 51C. The first bearing structure 51A is provided between the hub axle 40 and the first rotatable member 42 to rotatably support the first rotatable member 42 relative to the hub axle 40 about the rotational center axis A1. The second bearing structure 51B is provided between the first rotatable member 42 and the second rotatable member 44 to rotatably support the second rotatable member 44 relative to the first rotatable member 42 about the rotational center axis A1. The third bearing structure 51C is provided between the hub axle 40 and the second rotatable member 44 to rotatably support the second rotatable member 44 relative to the hub axle 40 about the rotational center axis A1.

Figure 7:
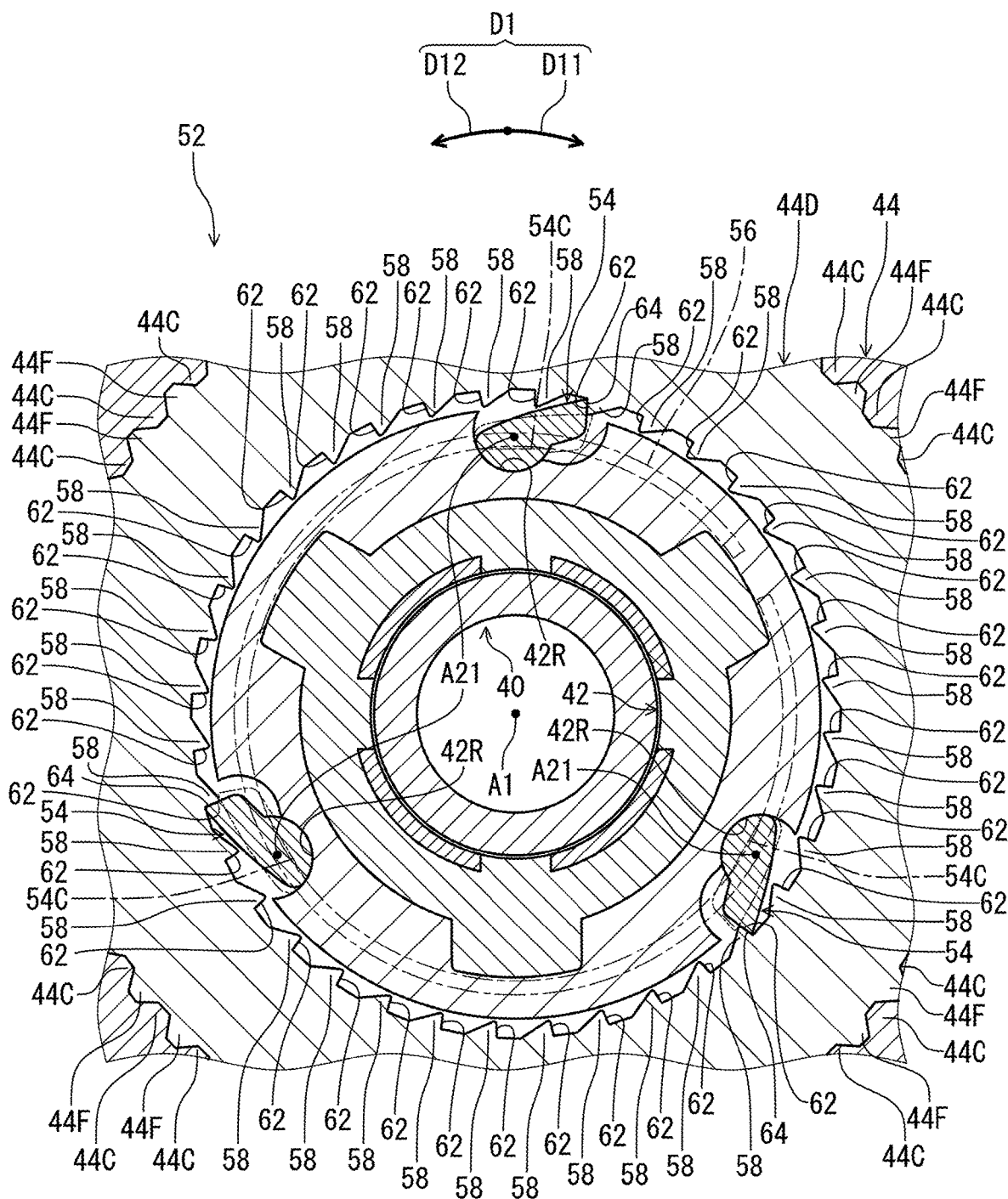
FIG. 7 is a cross-sectional view of the hub assembly taken along line VII-VII of FIG. 6.

As seen in FIG. 7, the rotation control structure 50 includes a first one-way clutch 52. The first one-way clutch 52 is provided between the first rotatable member 42 and the second rotatable member 44 to transmit the first input rotation R11 of the first rotatable member 42 to the second rotatable member 44 at the first ratio. The first one-way clutch 52 is provided between the first rotatable member 42 and the second rotatable member 44 to restrict the first rotatable member 42 to rotate relative to the second rotatable member 44 about the rotational center axis A1 in the first rotational direction D11. The first one-way clutch 52 is provided between the first rotatable member 42 and the second rotatable member 44 to allow the first rotatable member 42 to rotate relative to the second rotatable member 44 about the rotational center axis A1 in a second rotational direction D12 which is an opposite direction of the first rotational direction D11. The first rotational direction D11 is defined along a circumferential direction D1 about the rotational center axis A1 The second rotational direction D12 is defined along a circumferential direction D1 about the rotational center axis A1.

Figure 8:
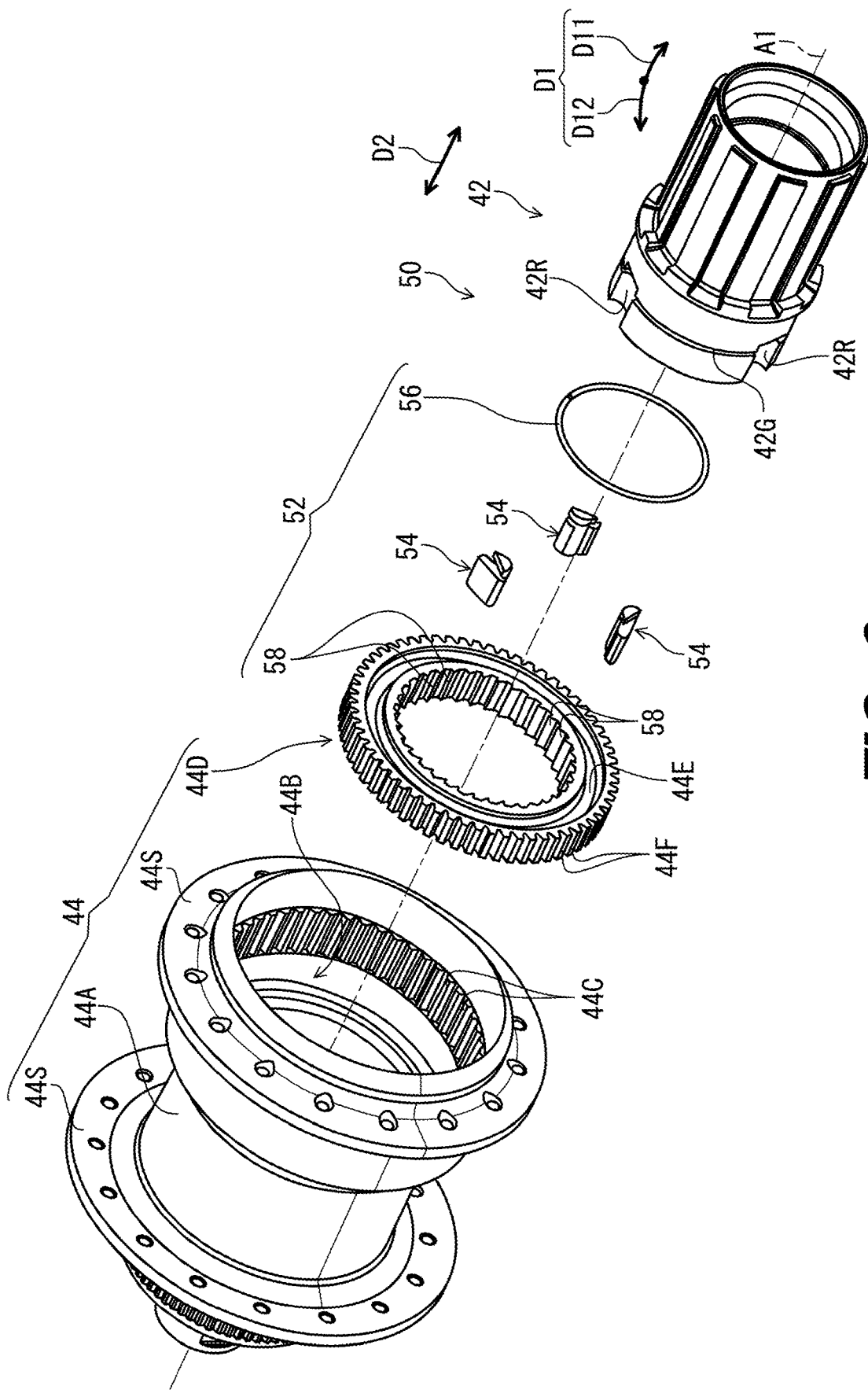
FIG. 8 is a partial perspective view of the hub assembly illustrated in FIG. 4.

As seen in FIG. 8, the first one-way clutch 52 includes a plurality of first pawls 54, a first ring spring 56, and a plurality of first ratchet teeth 58. The plurality of first pawls 54 is movably coupled to the first rotatable member 42. The first ring spring 56 movably couples the plurality of first pawls 54 to the first rotatable member 42. The second rotatable member 44 includes tubular body 44A and a ratchet wheel 44D. The tubular body 44A includes an internal space 44B. The ratchet wheel 44D is provided in the internal space 44B of the tubular body 44A. The ratchet wheel 44D is attached to the tubular body 44A to be integrally rotatable with the tubular body 44A.

The ratchet wheel 44D includes an annular body 44E and a plurality of first external spline teeth 44F. The plurality of first external spline teeth 44F is provided on an outer periphery of the annular body 44E. The plurality of first ratchet teeth 58 is provided on an inner periphery of the annular body 44E. The second rotatable member 44 includes a plurality of internal spline teeth 44C provided on an inner peripheral surface of the tubular body 44A. The plurality of first external spline teeth 44F of the ratchet wheel 44D meshes with the plurality of internal spline teeth 44C so that the ratchet wheel 44D rotates integrally with the tubular body 44A about the rotational center axis A1.

As seen in FIG. 7, the first one-way clutch 52 includes a first receiving surface 62 and a first contactable surface 64. The first receiving surface 62 is provided at one of the first rotatable member 42 and the second rotatable member 44. The first contactable surface 64 is configured to contact the first receiving surface 62 to transmit the first input rotation R11 of the first rotatable member 42 to the second rotatable member 44 at the first ratio.

In this embodiment, the first one-way clutch 52 includes a plurality of first receiving surfaces 62 and a plurality of first contactable surface 64. The plurality of first receiving surfaces 62 is provided at the second rotatable member 44. The plurality of first contactable surfaces 64 is provided at the first rotatable member 42. However, the plurality of first receiving surfaces 62 can be provided at the first rotatable member 42. A total number of the first receiving surfaces 62 is not limited to this embodiment. A total number of the first contactable surfaces 64 is not limited to this embodiment.

The plurality of first ratchet teeth 58 respectively includes the plurality of first receiving surfaces 62. The plurality of first pawls 54 respectively includes the plurality of first contactable surfaces 64. The plurality of first ratchet teeth 58 is arranged in the circumferential direction D1. The plurality of first pawls 54 is arranged in the circumferential direction D1. The first rotatable member 42 includes a plurality of first recesses 42R. The first pawl 54 is movably provided in the first recess 42R. The first pawl 54 is pivotally provided in the first recess 42R about a first axis A21.

Figure 9:
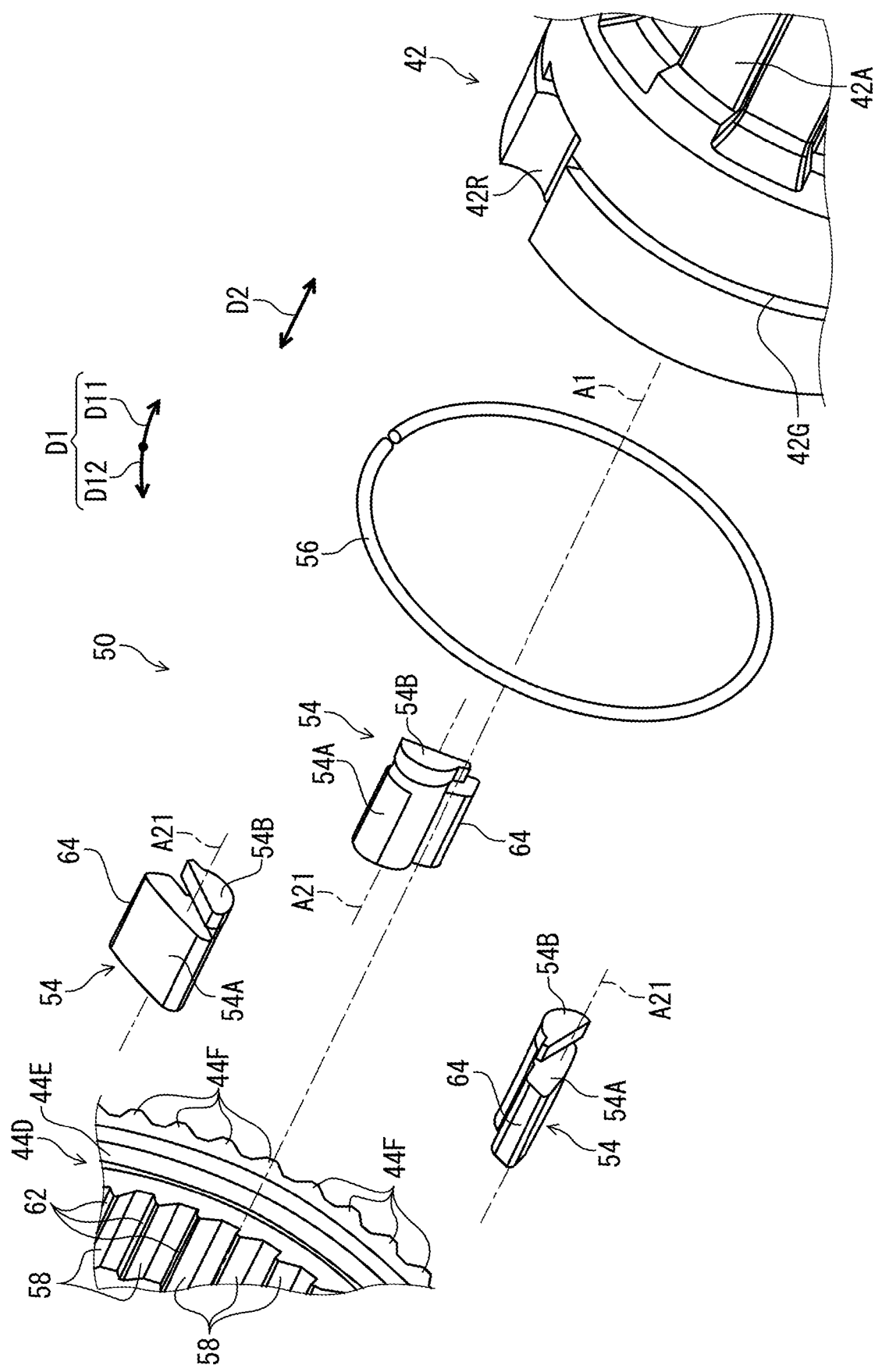
FIG. 9 is an enlarged partial perspective view of the hub assembly illustrated in FIG. 4.
Figure 10:
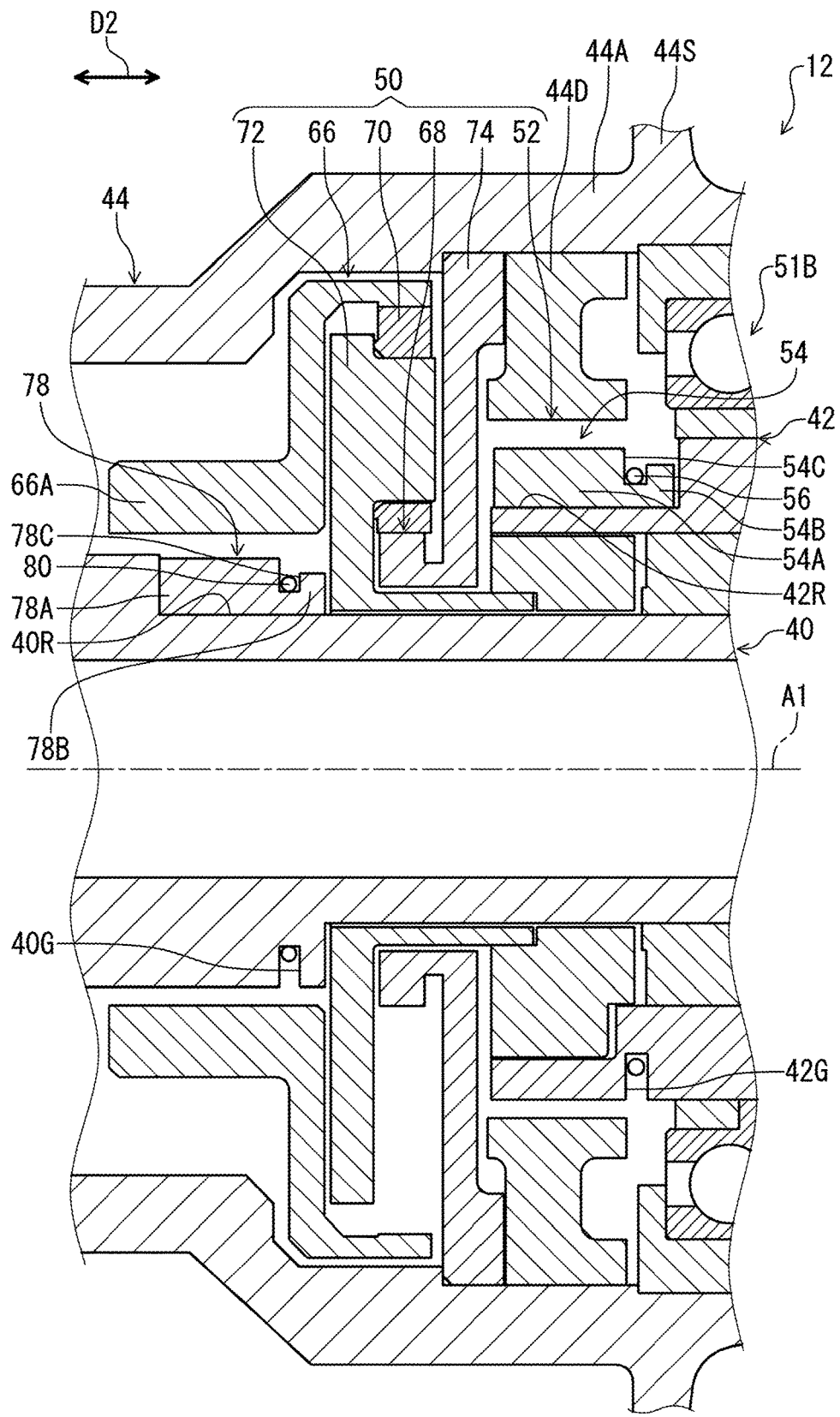
FIG. 10 is a partial cross-sectional view of the hub assembly taken along line X-X of FIG. 4.

As seen in FIG. 9, the first pawl 54 includes a first pawl body 54A and a first support part 54B. The first pawl body 54A includes the first contactable surface 64. The first support part 54B protrudes from the first pawl body 54A in an axial direction D2 parallel to the rotational center axis A1. As seen in FIG. 10, the first pawl 54 includes a first groove 54C provided between the first pawl body 54A and the first support part 54B. As seen in FIG. 7, the first ring spring 56 is provided in the first grooves 54C of the first pawls 54. The first ring spring 56 movably holds the plurality of first pawls 54 in a first lock position. In a lock state where the plurality of first pawls 54 is in the first lock position, three surfaces of the plurality of first receiving surfaces 62 of the plurality of first ratchet teeth 58 are respectively engaged with the plurality of first contactable surfaces 64 of the plurality of first pawls 54 to restrict the first rotatable member 42 from rotating relative to the second rotatable member 44 in the first rotational direction D11. The plurality of first pawls 54 and the plurality of first ratchet teeth 58 allow the first rotatable member 42 to rotate relative to the second rotatable member 44 in the second rotational direction D12. In other words, the plurality of first pawls 54 and the plurality of first ratchet teeth 58 allow the second rotatable member 44 to rotate relative to the first rotatable member 42 in the first rotational direction D11. As seen in FIGS. 6 and 9, the first rotatable member 42 includes an annular groove 42G. The first ring spring 56 is provided in the annular groove 42G.

Figure 11:
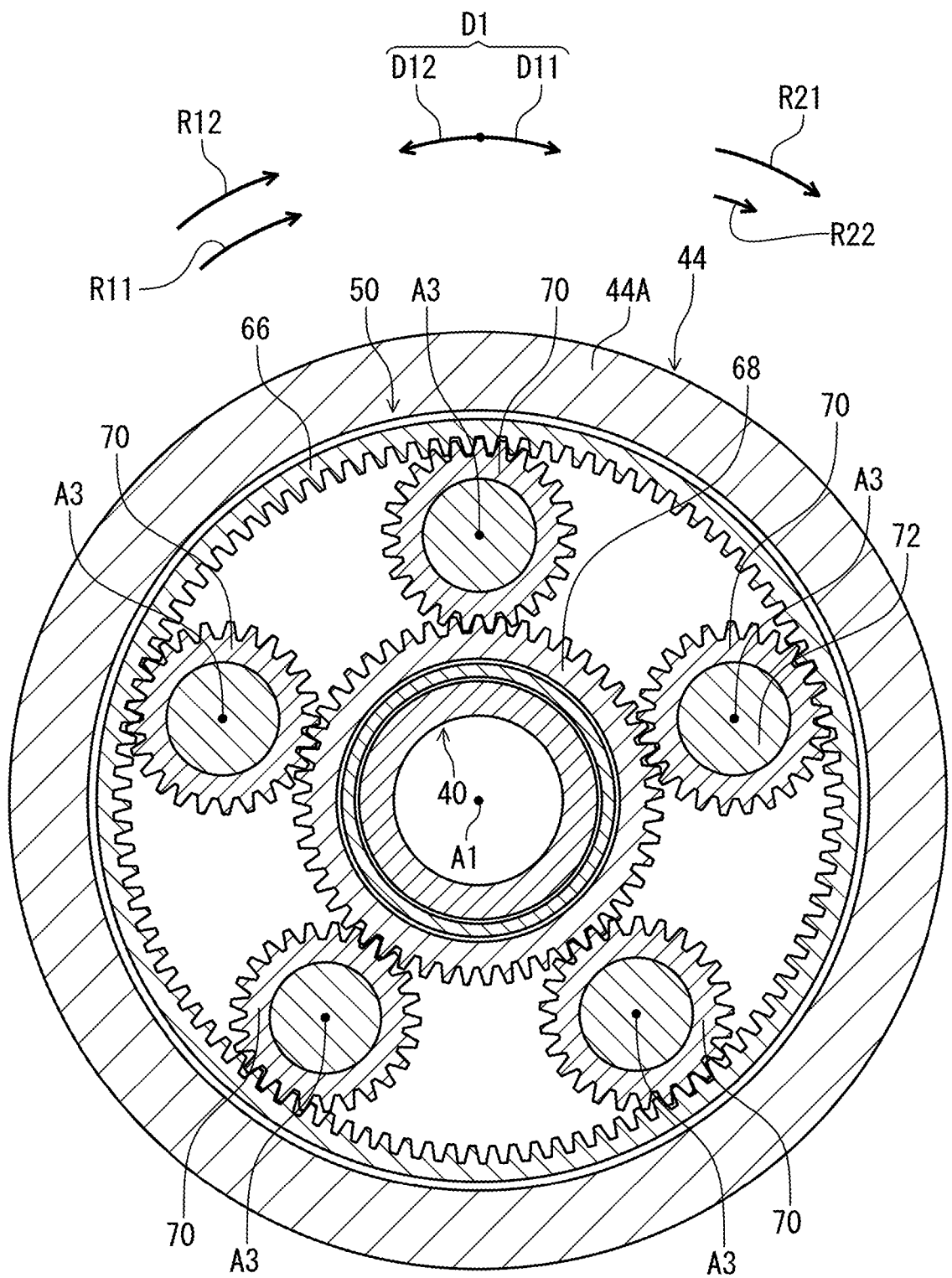
FIG. 11 is a partial cross-sectional view of the hub assembly taken along line XI-XI of FIG. 6.

As seen in FIG. 11, the rotation control structure 50 includes a ring gear 66, a sun gear 68, and at least one planetary gear 70. The ring gear 66 is rotatable relative to the hub axle 40, the first rotatable member 42 (FIG. 6), and the second rotatable member 44 about the rotational center axis A1. The at least one planetary gear 70 is engaged with the ring gear 66 and the sun gear 68 to transmit the second input rotation R21 of the second rotatable member 44 to the first rotatable member 42 (FIG. 6) at the second ratio. The at least one planetary gear 70 is provided between the sun gear 68 and the ring gear 66 to transmit a rotation of the ring gear 66 to the sun gear 68 at the second ratio.

In this embodiment, the rotation control structure 50 includes a plurality of planetary gears 70. The plurality of planetary gears 70 is engaged with the ring gear 66 and the sun gear 68 to transmit the second input rotation R21 of the second rotatable member 44 to the first rotatable member 42 (FIG. 6) at the second ratio. The plurality of planetary gears 70 is provided between the sun gear 68 and the ring gear 66 to transmit a rotation of the ring gear 66 to the sun gear 68 at the second ratio. The rotation control structure 50 includes five planetary gears 70. However, a total number of the planetary gears 70 is not limited to this embodiment.

Figure 12:
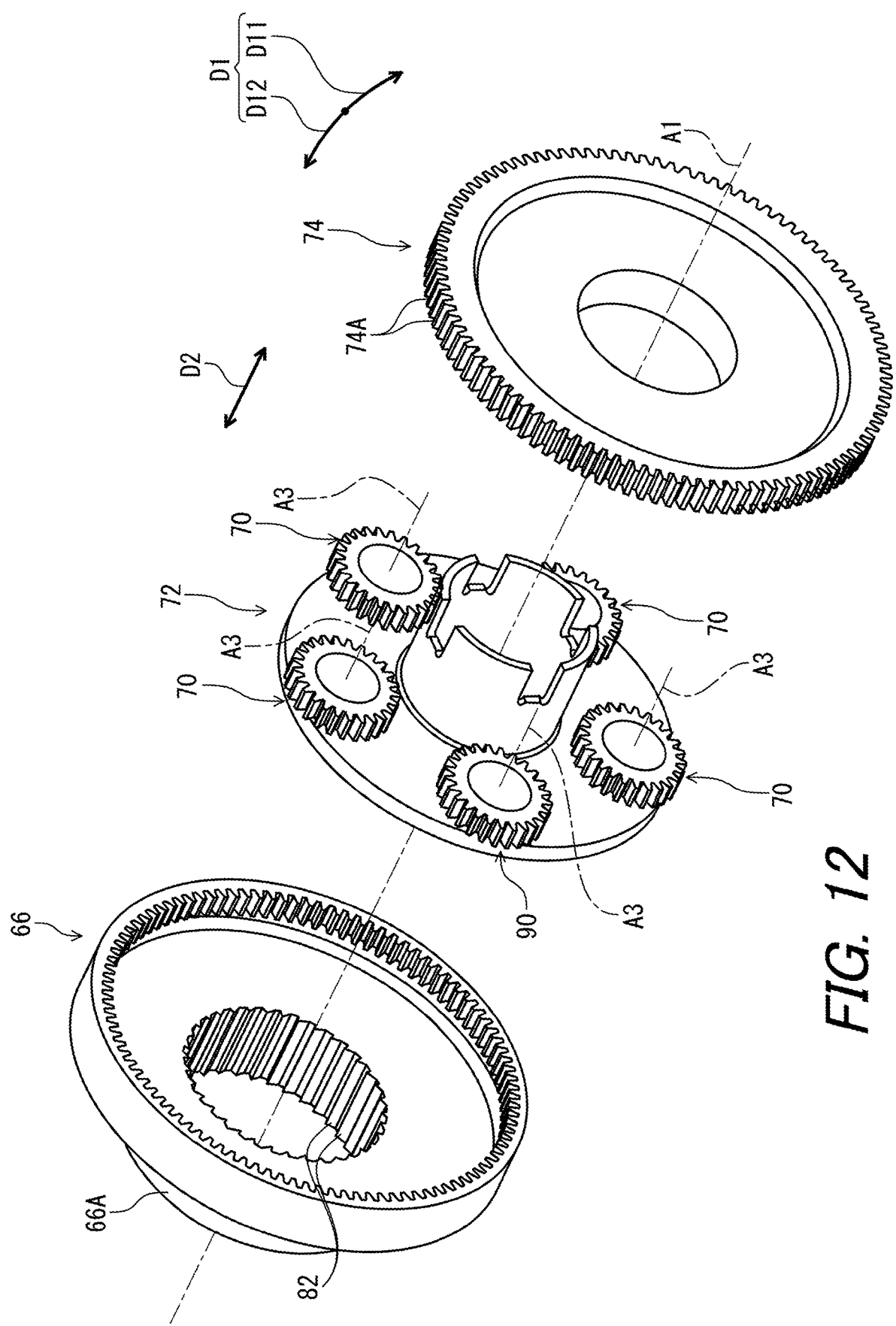
FIG. 12 is another partial perspective view of the hub assembly illustrated in FIG. 4.

As seen in FIG. 12, the at least one planetary gear 70 is rotatably coupled to the first rotatable member 42. In this embodiment, the rotation control structure 50 includes a carrier 72. Each of the planetary gear 70 is rotatably coupled to the carrier 72 about a rotational axis A3. The carrier 72 is configured to rotatably support the plurality of planetary gears 70 about the rotational center axis A1. As seen in FIG. 6, the carrier 72 is rotatably mounted on the hub axle 40 about the rotational center axis A1. The carrier 72 is coupled to the first rotatable member 42 and is rotatable integrally with the first rotatable member 42 about the rotational center axis A1.

Figure 13:
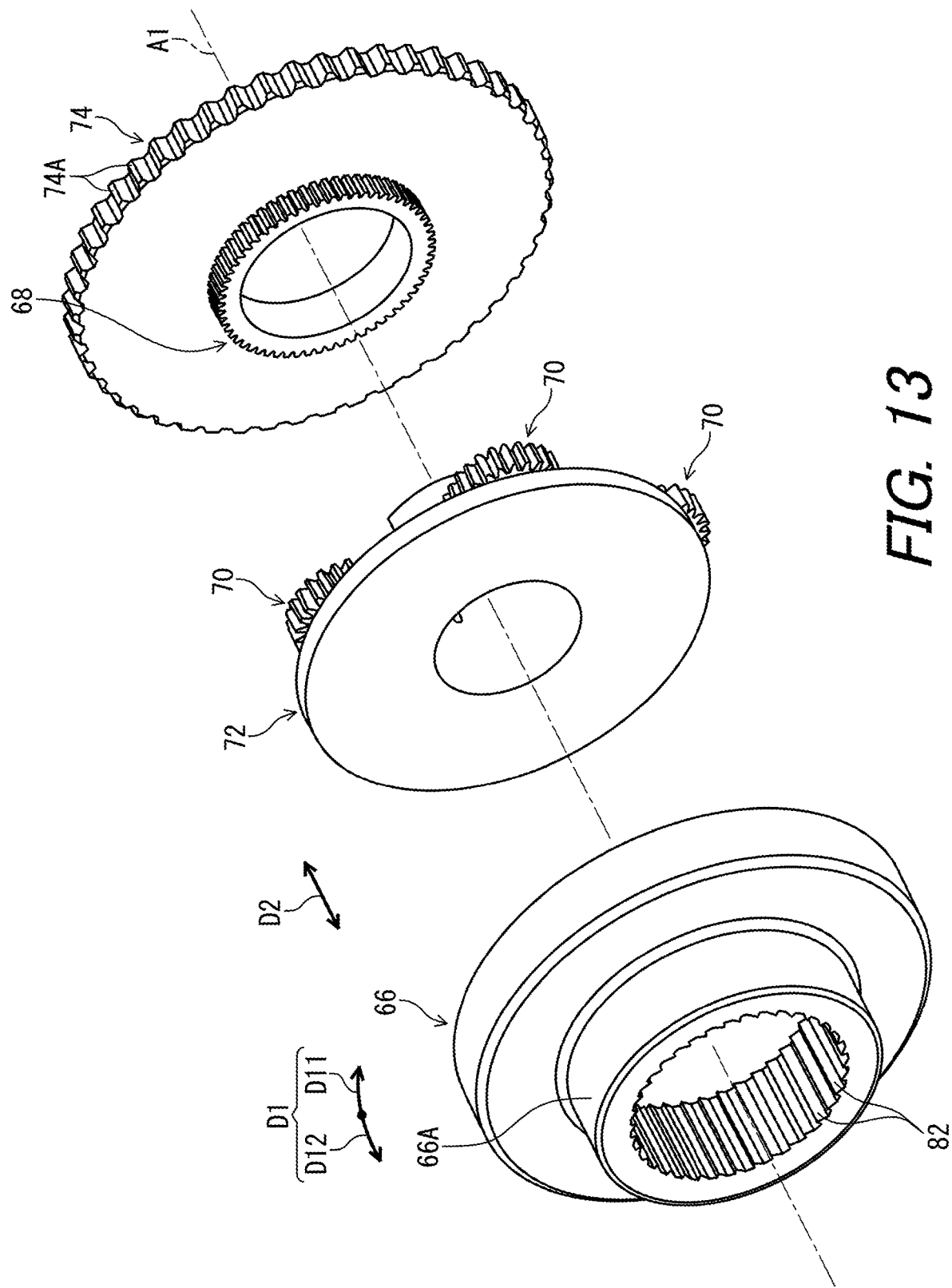
FIG. 13 is another partial perspective view of the hub assembly illustrated in FIG. 4.

As seen in FIG. 13, the rotation control structure 50 includes a base plate 74. The base plate 74 has an annular shape. The sun gear 68 is coupled to the base plate 74. The base plate 74 includes a plurality of second external spline teeth 74A meshes with the plurality of internal spline teeth 44C (FIG. 8) of the second rotatable member 44 so that the base plate 74 rotates integrally with the second rotatable member 44 about the rotational center axis A1. Thus, the sun gear 68 is coupled to the second rotatable member 44 to rotate along with the second rotatable member 44 relative to the hub axle 40 and the first rotatable member 42.

Figure 14:
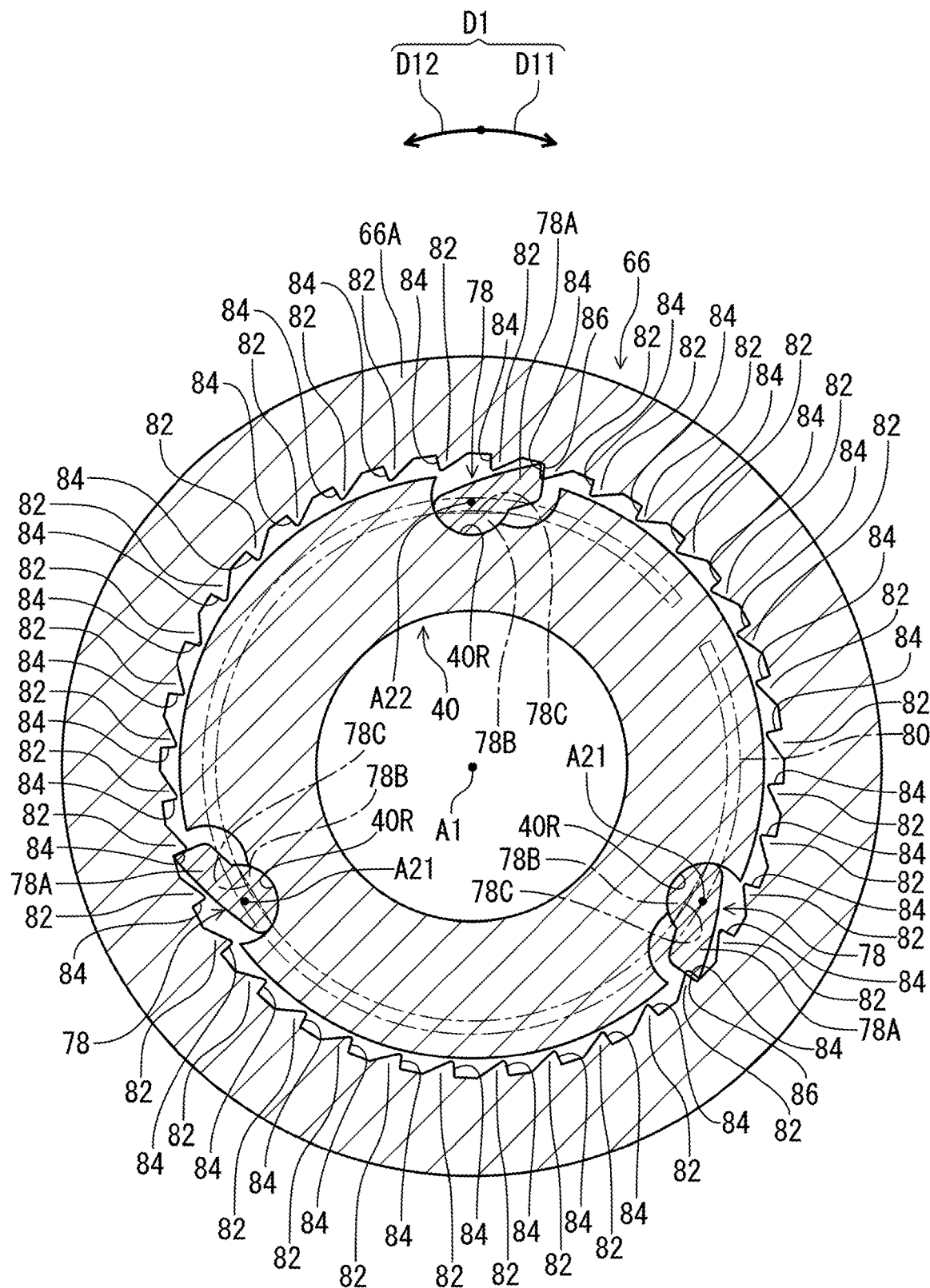
FIG. 14 is a cross-sectional view of the hub assembly taken along line XIV-XIV of FIG. 6.

As seen in FIG. 14, the rotation control structure 50 includes a second one-way clutch 76. The second one-way clutch 76 is provided between the hub axle 40 and the ring gear 66 to allow the ring gear 66 to rotate relative to the hub axle 40 in the first rotational direction D11 and to restrict the ring gear 66 from rotating relative to the hub axle 40 about the rotational center axis A1 in the second rotational direction D12 which is an opposite direction of the first rotational direction D11.

The second one-way clutch 76 includes a plurality of second pawls 78, a second ring spring 80, and a plurality of second ratchet teeth 82. The plurality of second pawls 78 is movably coupled to the hub axle 40. The second ring spring 80 movably couples the plurality of second pawls 78 to the hub axle 40. The ring gear 66 includes an annular body 66A. The plurality of second ratchet teeth 82 is provided on an inner periphery of the annular body 66A. The plurality of second ratchet teeth 82 is integrally provided with the ring gear 66 as a one-piece unitary member. However, the plurality of second ratchet teeth 82 can be separate members from the ring gear 66.

The second one-way clutch 76 includes a second receiving surface 84 and a second contactable surface 86. The second receiving surface 84 is provided at one of the hub axle 40 and the ring gear 66. The second contactable surface 86 is configured to contact the second receiving surface 84 to restrict the ring gear 66 from rotating relative to the hub axle 40 about the rotational center axis A1 in the second rotational direction D12.

In this embodiment, the second one-way clutch 76 includes a plurality of second receiving surfaces 84 and a plurality of second contactable surface 86. The plurality of second receiving surfaces 84 is provided at the ring gear 66. The plurality of second contactable surfaces 86 is provided at the first rotatable member 42. However, the plurality of second receiving surfaces 84 can be provided at the hub axle 40. A total number of the second receiving surfaces 84 is not limited to this embodiment. A total number of the second contactable surfaces 86 is not limited to this embodiment.

The plurality of second ratchet teeth 82 respectively includes the plurality of second receiving surfaces 84. The plurality of second pawls 78 respectively includes the plurality of second contactable surfaces 86. The plurality of second ratchet teeth 82 is arranged in the circumferential direction D1. The plurality of second pawls 78 is arranged in the circumferential direction D1. The first rotatable member 42 includes a plurality of second recesses 40R. The second pawl 78 is movably provided in the second recess 40R. The second pawl 78 is pivotally provided in the second recess 40R about a second axis A22.

As seen in FIG. 14, the second pawl 78 includes a second pawl body 78A and a second support part 78B. The second pawl body 78A includes the second contactable surface 86. As seen in FIG. 10, the second pawl 78 includes a second groove 78C provided between the second pawl body 78A and the second support part 78B. As seen in FIG. 14, the second ring spring 80 is provided in the second grooves 78C of the second pawls 78. The second ring spring 80 movably holds the plurality of second pawls 78 in a second lock position. In a lock state where the plurality of second pawls 78 is in the second lock position, three surfaces of the plurality of second receiving surfaces 84 of the plurality of second ratchet teeth 82 are respectively engaged with the plurality of second contactable surfaces 86 of the plurality of second pawls 78 to restrict the ring gear 66 from rotating relative to the hub axle 40 in the second rotational direction D12. The plurality of second pawls 78 and the plurality of second ratchet teeth 82 allow the ring gear 66 to rotate relative to the hub axle 40 in the first rotational direction D11. As seen in FIG. 10, the hub axle 40 includes an annular groove 40G. The second ring spring 80 is provided in the annular groove 40G.

Figure 15:
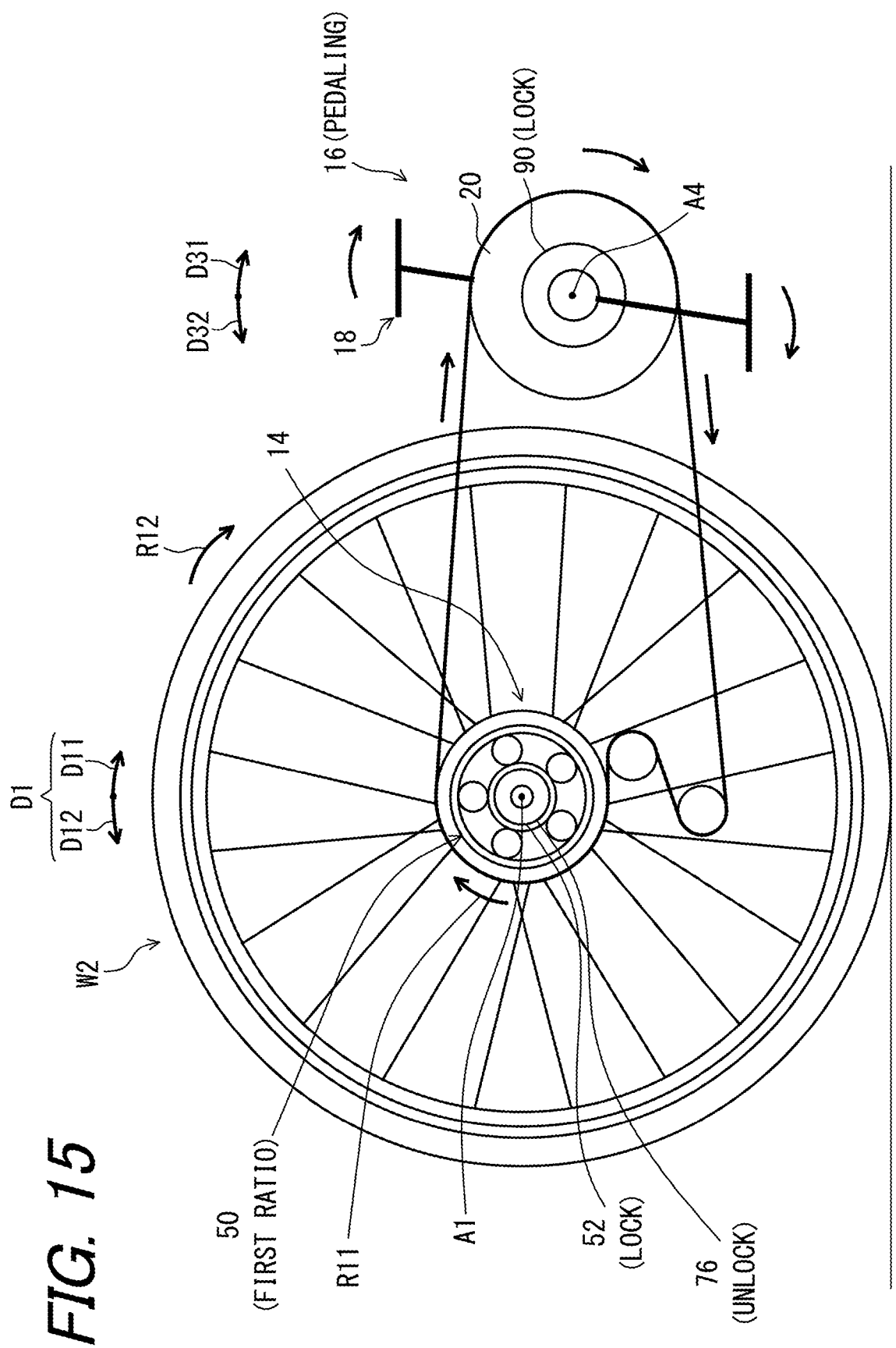
FIG. 15 is a schematic elevational view of the drive train of the human-powered vehicle illustrated in FIG. 1 (during pedaling).
Figure 16:
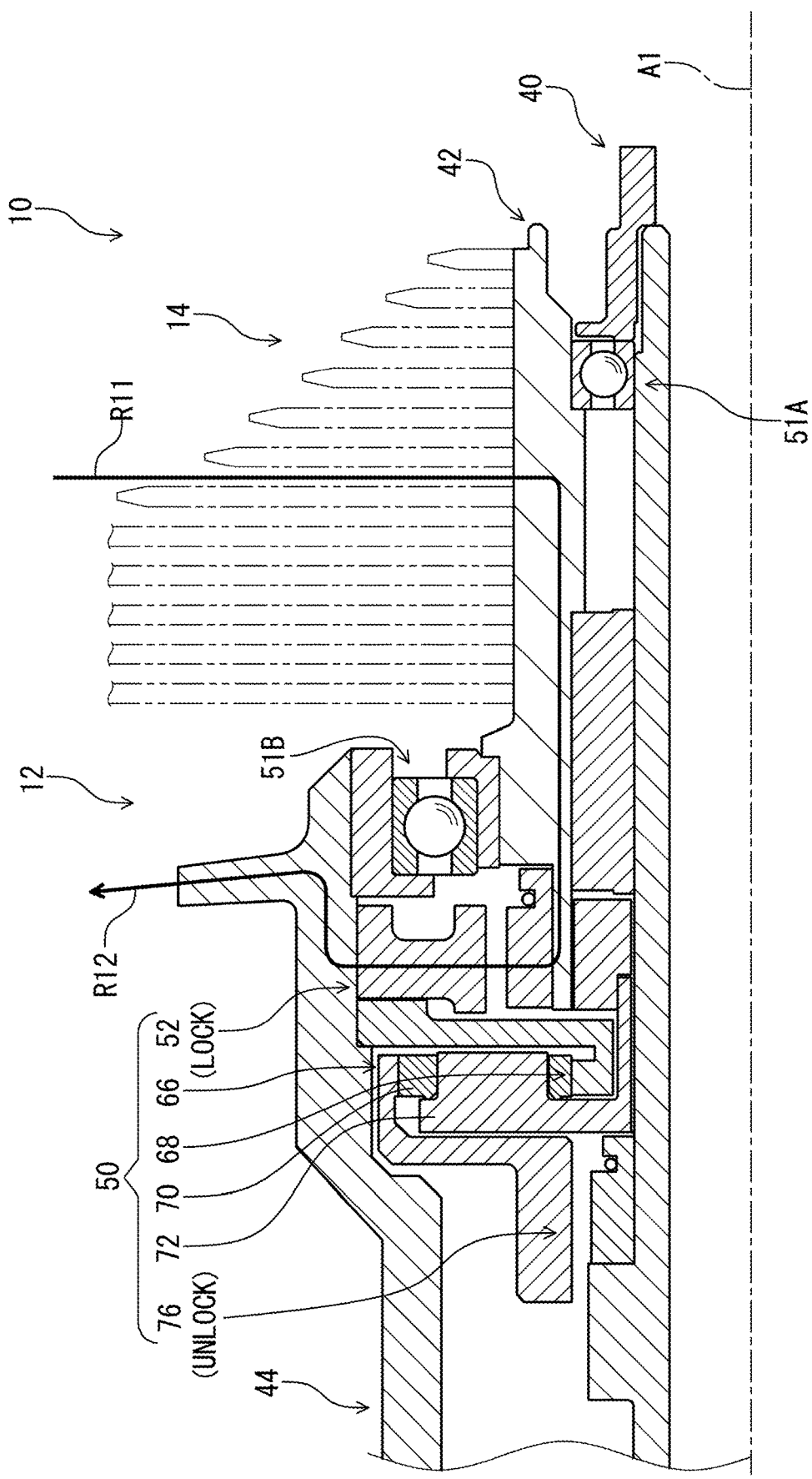
FIG. 16 is a partial cross-sectional view of the hub assembly of the human-powered vehicle illustrated in FIG. 1 (during pedaling).

As seen in FIG. 15, the crank assembly 16 comprises an additional one-way clutch 90. The additional sprocket 20 is rotatable relative to the crank 18 about an additional rotational center axis A4. The additional one-way clutch 90 is provided between the crank 18 and the additional sprocket 20 to restrict the crank 18 from rotating relative to the additional sprocket 20 in a first crank-rotational direction D31. In other words, the additional sprocket 20 is rotated relative to the vehicle frame VH1 (FIG. 1) along with the crank 18 in the first crank-rotational direction D31 during pedaling. The first one-way clutch 52 is in the lock state while the second one-way clutch 76 is in an unlock state. Thus, as seen in FIG. 16, the first input rotation R11 of the first rotatable member 42 is directly transmitted to the second rotatable member 44 through the first one-way clutch 52. At this time, the ring gear 66, the sun gear 68, the plurality of planetary gears 70, and the carrier 72 rotate along with the first rotatable member 42 and the second rotatable member 44 relative to the hub axle 40 about the rotational center axis A1 since the second one-way clutch 76 allows the ring gear 66 to rotate relative to the hub axle 40 about the rotational center axis A1.

Figure 17:
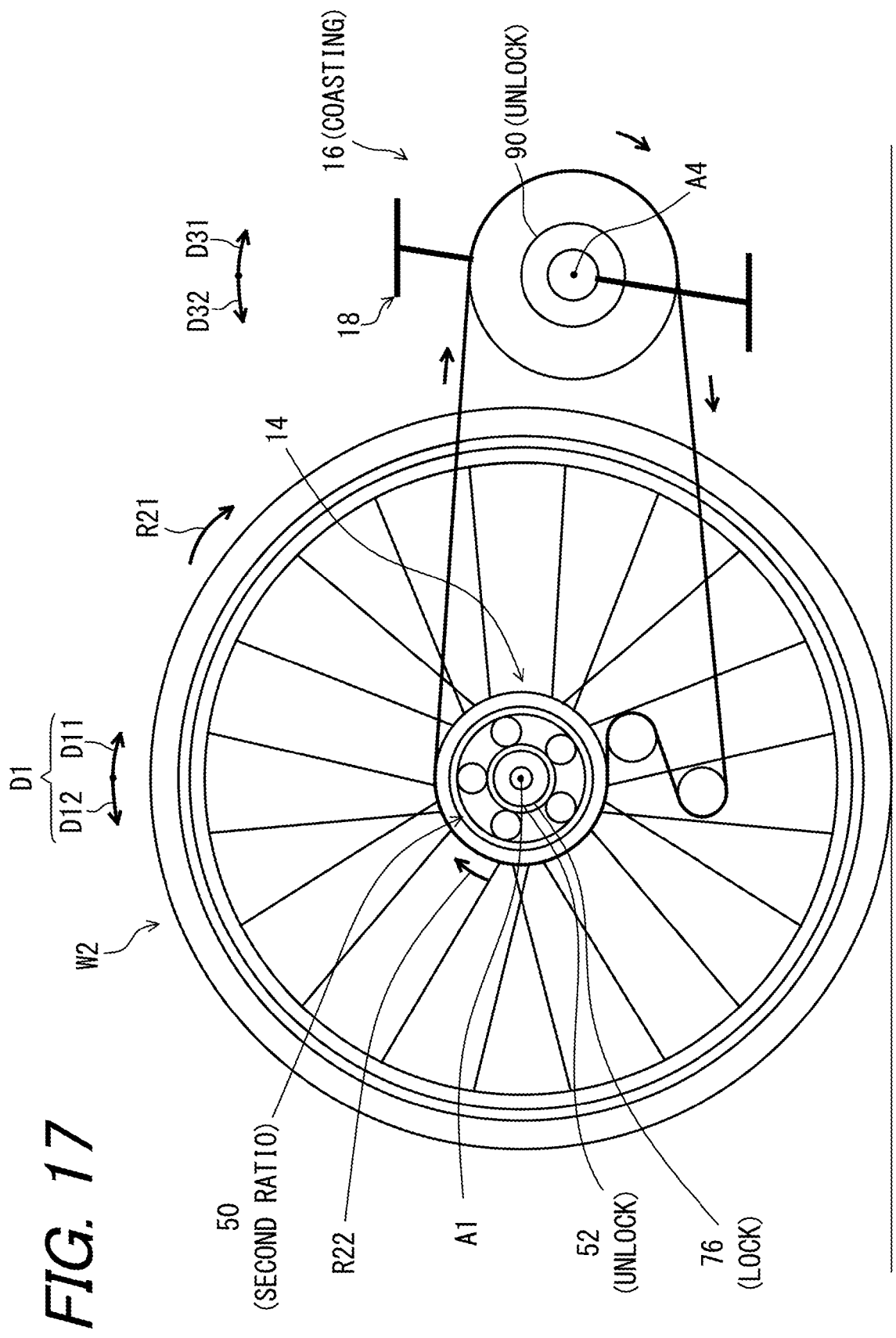
FIG. 17 is a schematic elevational view of the drive train of the human-powered vehicle illustrated in FIG. 1 (during coasting).
Figure 18:
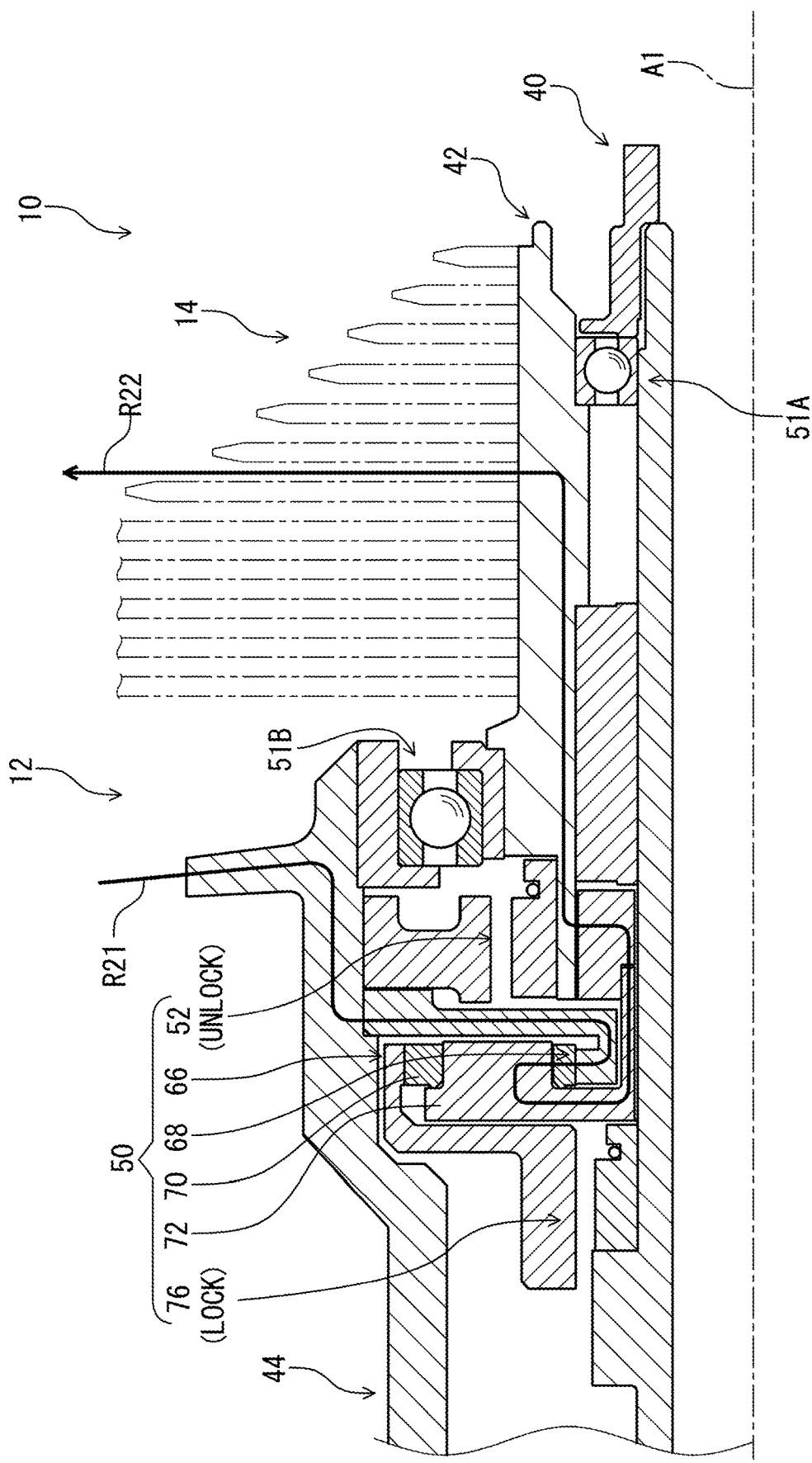
FIG. 18 is a partial cross-sectional view of the hub assembly of the drive train of the human-powered vehicle illustrated in FIG. 1 (during coasting).

As seen in FIG. 17, the additional one-way clutch 90 is provided between the crank 18 and the additional sprocket 20 to allow the crank 18 to rotate relative to the additional sprocket 20 in a second crank-rotational direction D32 which is an opposite direction of the first crank-rotational direction D31. In other words, the additional one-way clutch 90 allows the additional sprocket 20 to rotate relative to the crank 18 in the first crank-rotational direction D31 during coasting. As seen in FIG. 18, the second input rotation R21 of the second rotatable member 44 is transmitted to the first rotatable member 42 through the sun gear 68, the plurality of planetary gears 70, and the carrier 72 since the second one-way clutch 76 is in the lock state. The second input rotation R21 of the second rotatable member 44 is reduced by the sun gear 68, the plurality of planetary gears 70, and the carrier 72 at the second ratio. At this time, the first one-way clutch 52 allows a relative rotation between the first rotatable member 42 and the second rotatable member 44. Thus, the second input rotation R21 of the second rotatable member 44 is transmitted to the first rotatable member 42 at the second ratio.

As seen in FIG. 17, the second output rotation R22 of the first rotatable member 42 is transmitted to the additional sprocket 20 through the chain 22. Thus, the plurality of sprockets 14 and the additional sprocket 20 are rotated during coasting at a rotational speed which is lower than a rotational speed of the plurality of sprockets 14 during pedaling. This allows the gear shifting device 24 to change a gear position of the drive train 10 during coasting in both the manual shift mode and the automatic shift mode. As seen in FIGS. 16 and 17, a route through which the first input rotation R11 is transmitted from the first rotatable member 42 to the second rotatable member 44 during pedaling is different from a route through which the second input rotation R21 is transmitted from the second rotatable member 44 to the first rotatable member 42 during coasting.

Figure 19:
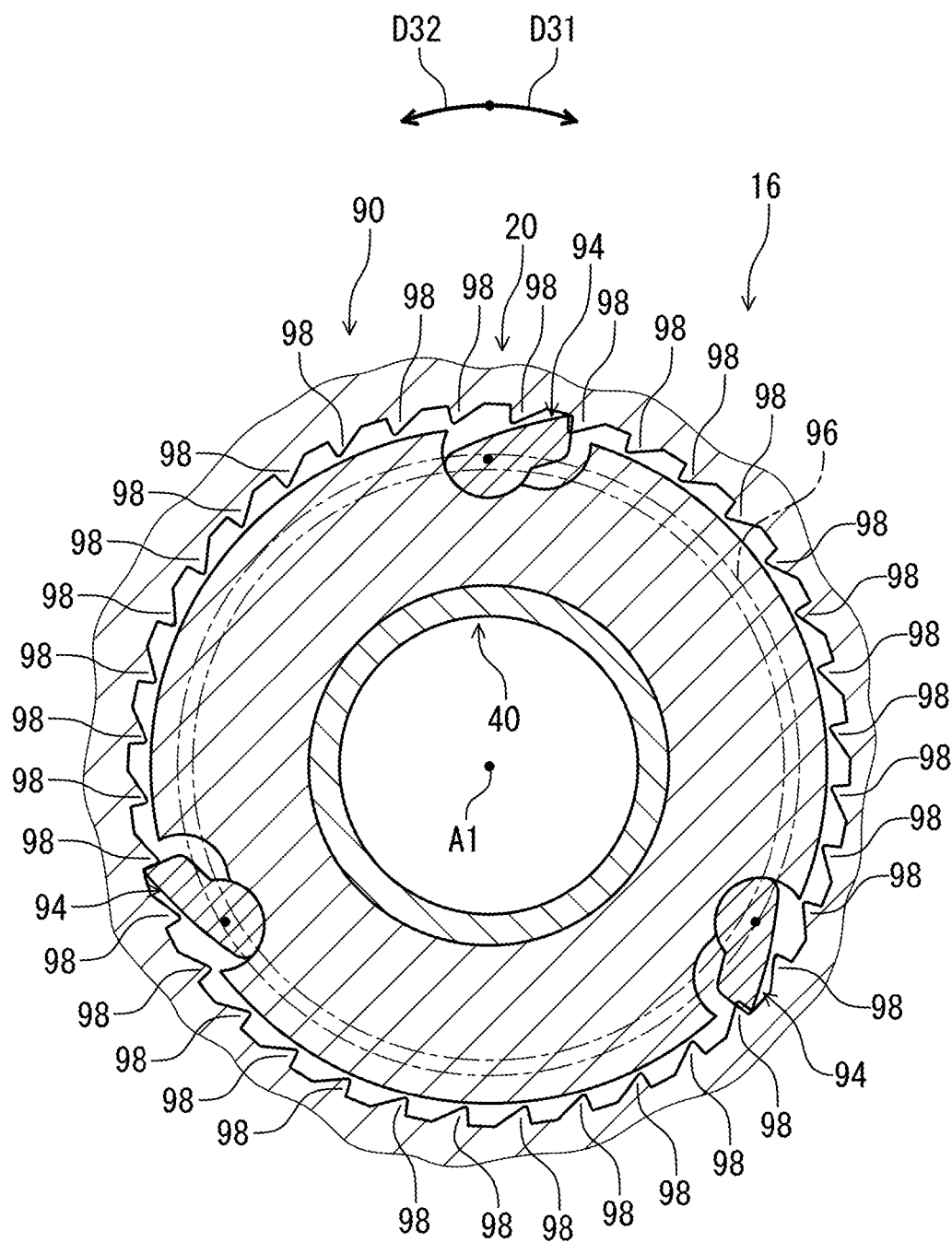
FIG. 19 is a cross-sectional view of a crank assembly of the drive train illustrated in FIG. 2.

As seen in FIG. 19, the additional one-way clutch 90 includes a plurality of additional pawls 94, an additional ring spring 96, and a plurality of additional ratchet teeth 98. The plurality of additional pawls 94 is movably coupled to the crank 18. The additional ring spring 96 movably couples the plurality of additional pawls 94 to the crank 18. The additional ring spring 96 movably holds the plurality of additional pawls 94. The plurality of additional pawls 94, the additional ring spring 96, and the plurality of additional ratchet teeth 98 have the same structures as the structures of the plurality of first pawls 54, the first ring spring 56, and the plurality of first ratchet teeth 58. Thus, it will not be described in detail here for the sake of brevity.

Second Embodiment

A drive train 210 including a hub assembly 212 in accordance with a second embodiment will be described below referring to FIGS. 20 to 23. The hub assembly 212 has the same structure as the structure of the hub assembly 12 except for the rotation control structure 50. Thus, elements having substantially the same function as those in the first embodiment will be numbered the same here and will not be described and/or illustrated again in detail here for the sake of brevity.

Figure 20:
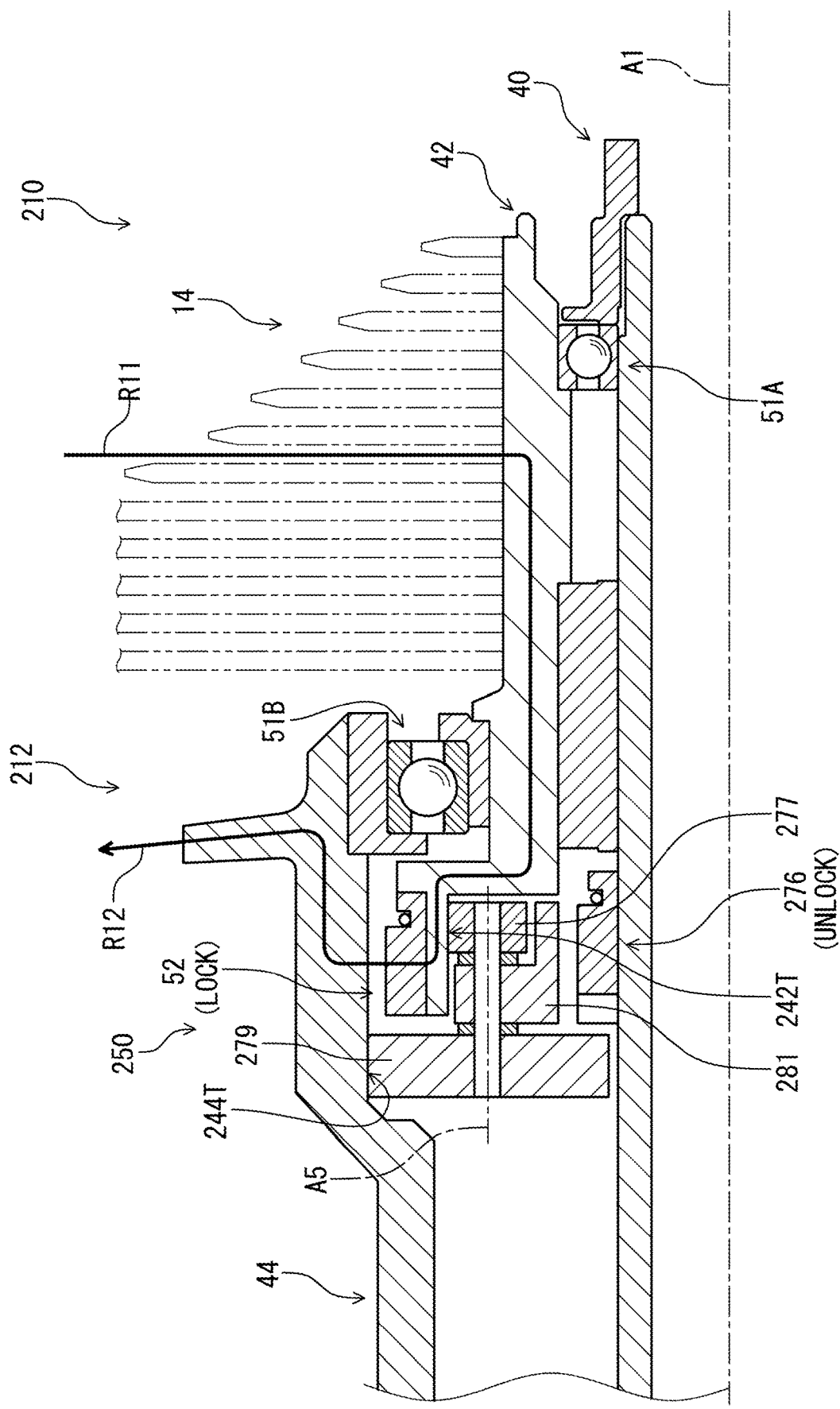
FIG. 20 is a partial cross-sectional view of a hub assembly of a drive train in accordance with a second embodiment (during pedaling).
Figure 21:
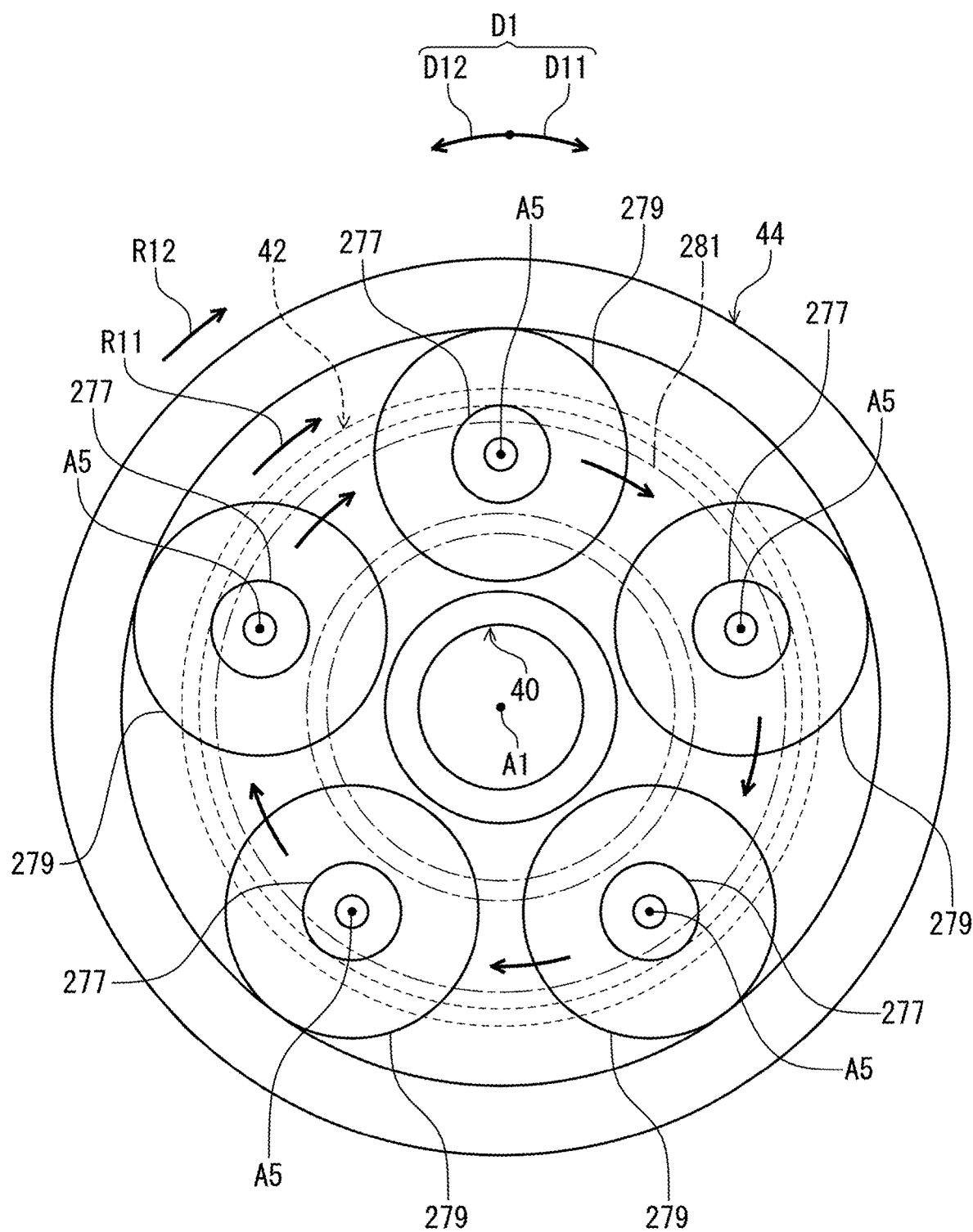
FIG. 21 is a schematic elevational view of a rotation control structure of the hub assembly illustrated in FIG. 20 (during pedaling).

As seen in FIGS. 20 and 21, the hub assembly 212 comprises the hub axle 40, the first rotatable member 42, the second rotatable member 44, and a rotation control structure 250. The rotation control structure 250 includes the first one-way clutch 52, a second one-way clutch 276, a plurality of first gears 277, a plurality of second gears 279, and a gear support 281. Each of the plurality of first gears 277 is rotatably coupled to the gear support 281. Each of the plurality of second gears 279 is rotatably coupled to the gear support 281. The first gear 277 is coupled to the second gear 279 to be rotatable along with the second gear 279 relative to the gear support 281 about a rotational axis A5. The first rotatable member 42 includes a first internal gear 242T. The second rotatable member 44 includes a second internal gear 244T. The plurality of first gears 277 meshes with the first internal gear 242T. The plurality of second gears 279 meshes with the second internal gear 244T. The second one-way clutch 276 has substantially the same structure as the structure of the second one-way clutch 76 of the first embodiment. Thus, it will not be describe in detail here for the sake of brevity.

The rotation control structure 250 couples the first rotatable member 42 to the second rotatable member 44 to transmit the first input rotation R11 of the first rotatable member 42 to the second rotatable member 44 at the first ratio of the first output rotation R12 of the second rotatable member 44 to the first input rotation R11 of the first rotatable member 42. The first one-way clutch 52 is provided between the first rotatable member 42 and the second rotatable member 44 to transmit the first input rotation R11 of the first rotatable member 42 to the second rotatable member 44 at the first ratio. The first one-way clutch 52 is provided between the first rotatable member 42 and the second rotatable member 44 to restrict the first rotatable member 42 to rotate relative to the second rotatable member 44 about the rotational center axis A1 in the first rotational direction D11. The second one-way clutch 276 allows the plurality of first gears 277, the plurality of second gears 279, and the gear support 281 to rotate relative to the hub axle 40 about the rotational center axis A1 in the first rotational direction D11.

Figure 22:
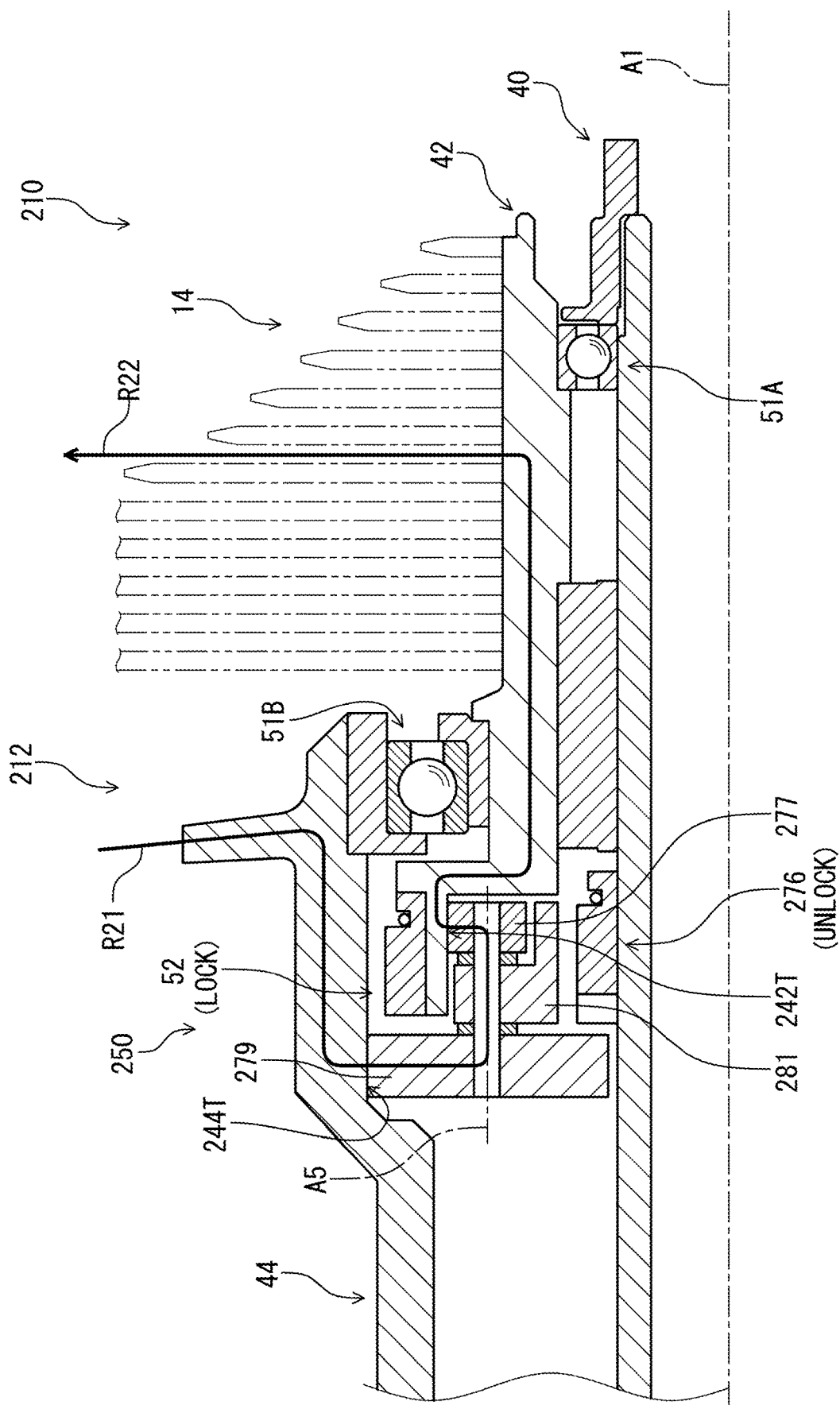
FIG. 22 is a partial cross-sectional view of the hub assembly of the drive train illustrated in FIG. 20 (during coasting).
Figure 23:
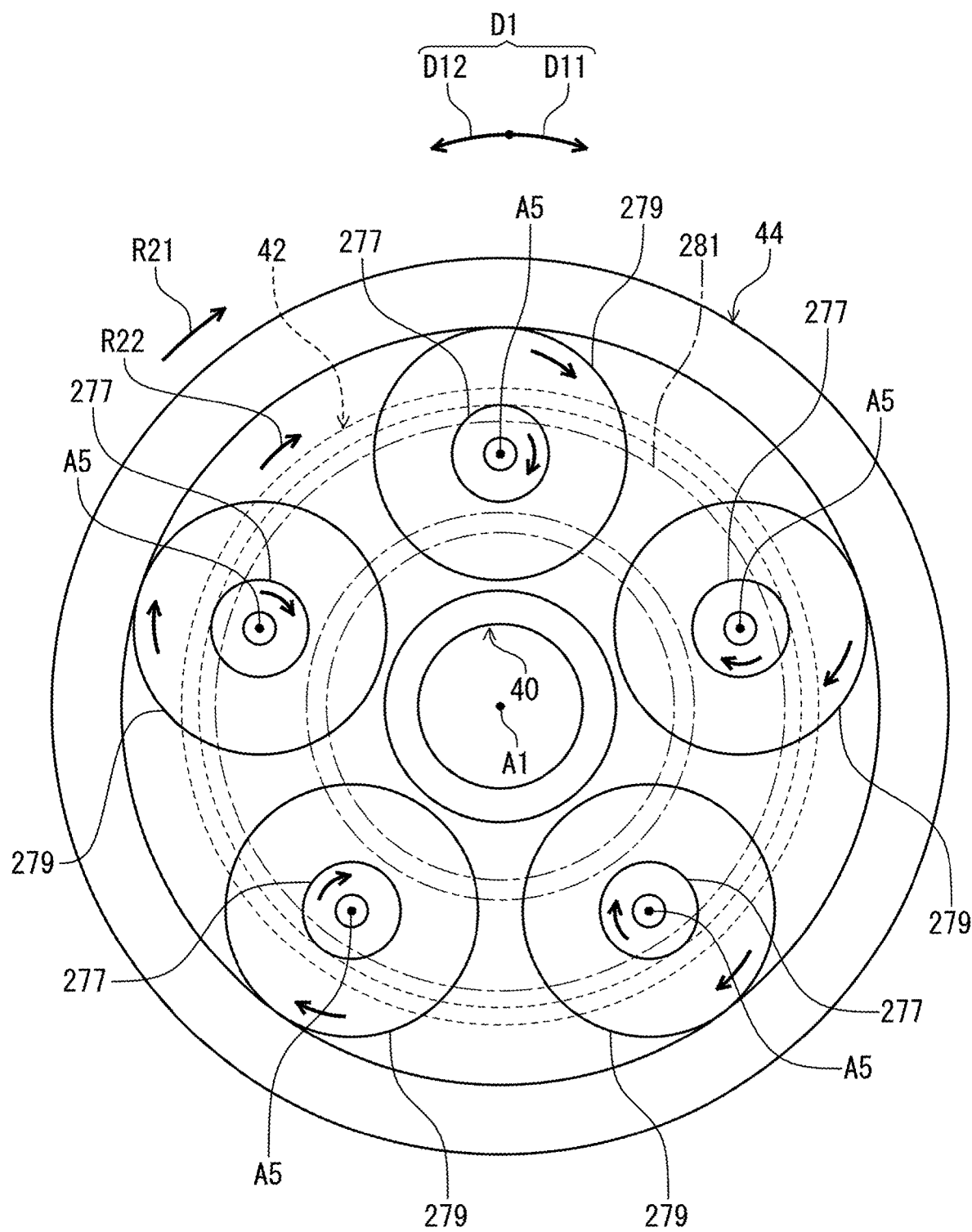
FIG. 23 is a schematic elevational view of the rotation control structure of the hub assembly illustrated in FIG. 20 (during coasting).

As seen in FIGS. 22 and 23, the rotation control structure 250 couples the second rotatable member 44 to the first rotatable member 42 to transmit the second input rotation R21 of the second rotatable member 44 to the first rotatable member 42 at the second ratio of the second output rotation R22 of the first rotatable member 42 to the second input rotation R21 of the second rotatable member 44. The first one-way clutch 52 is provided between the first rotatable member 42 and the second rotatable member 44 to allow the first rotatable member 42 to rotate relative to the second rotatable member 44 about the rotational center axis A1 in the second rotational direction D12 which is an opposite direction of the first rotational direction D11. The second one-way clutch 276 restricts the gear support 281 from rotating relative to the hub axle 40 about the rotational center axis A1 in the first rotational direction D11.

As seen in FIGS. 21 and 23, the second ratio is different from the first ratio. The second ratio is smaller than the first ratio. The first ratio is 1. The second ratio is larger than 0. The second ratio is smaller than 1. The second ratio is smaller than 0.5. In this embodiment, the second ratio is 0.25. However, the first ratio and the second ratio are not limited to this embodiment and the above ranges. The first ratio can be different from 1. The second ratio can be equal to or larger than 1. The second ratio can be equal to or larger than 0.5. In addition, the first ratio is different from a reciprocal number of the second ratio. Namely, a ratio N12/N11 (during pedaling) is different from a ratio N21/N22 (during coasting).

Modifications

The structures of the rotation control structures 50 and 250 are not limited to the above embodiments. The rotation control structure 50 and 250 can include other structures instead of or in addition to the ring gear 66, the sun gear 68, and the at least one planetary gear 70.

The structures of the first one-way clutch 52, the second one-way clutches 76 and 276, and the additional one-way clutch 90 are not limited to the above embodiments. For example, at least one of the first one-way clutch 52, the second one-way clutches 76 and 276, and the additional one-way clutch 90 can include other structures such as a sprag and a roller.

The sprocket engagement structure 6 can be omitted from the first rotatable member 42. The total number of the sprockets 14 is not limited to the above embodiments.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hub assembly for a human-powered vehicle, comprising:
    a hub axle;
    a first rotatable member rotatable relative to the hub axle about a rotational center axis, the first rotatable member including a sprocket engagement structure configured to engage with a plurality of sprockets;
    a second rotatable member rotatable relative to the hub axle and the first rotatable member about the rotational center axis; and
    a rotation control structure coupling the first rotatable member to the second rotatable member to transmit a first input rotation of the first rotatable member to the second rotatable member at a first ratio of a first output rotation of the second rotatable member to the first input rotation of the first rotatable member,
    the rotation control structure coupling the second rotatable member to the first rotatable member to transmit a second input rotation of the second rotatable member to the first rotatable member at a second ratio of a second output rotation of the first rotatable member to the second input rotation of the second rotatable member, the second ratio during coasting being different from the first ratio, the second ratio being larger than 0.

2. The hub assembly according to claim 1, wherein the second ratio is smaller than 1.

3. The hub assembly according to claim 1, wherein the rotation control structure includes a first one-way clutch provided between the first rotatable member and the second rotatable member to transmit the first input rotation of the first rotatable member to the second rotatable member at the first ratio.

4. The hub assembly according to claim 1, wherein the rotation control structure includes a ring gear, a sun gear, and at least one planetary gear engaged with the ring gear and the sun gear to transmit the second input rotation of the second rotatable member to the first rotatable member at the second ratio.

5. The hub assembly according to claim 1, wherein the first input rotation of the first rotatable member includes a rotation of the first rotatable member relative to the hub axle about the rotational center axis in a first rotational direction, and the first output rotation of the second rotatable member includes a rotation of the second rotatable member relative to the hub axle about the rotational center axis in the first rotational direction.

6. The hub assembly according to claim 5, wherein the second input rotation of the second rotatable member includes a rotation of the second rotatable member relative to the hub axle about the rotational center axis in the first rotational direction, and the second output rotation of the first rotatable member includes a rotation of the second rotatable member relative to the hub axle about the rotational center axis in the first rotational direction.

7. A drive train for a human-powered vehicle, comprising:
    the hub assembly according to claim 1;
    a plurality of sprockets mounted to the first rotatable member;
    a crank assembly comprising:
        a crank;
        an additional sprocket rotatable relative to the crank; and
        an additional one-way clutch provided between the crank and the additional sprocket to restrict the crank from rotating relative to the additional sprocket in a first crank-rotational direction and to allow the crank to rotate relative to the additional sprocket in a second crank-rotational direction which is an opposite direction of the first crank-rotational direction.

8. The drive train according to claim 7, further comprising a gear shifting device configured to shift a chain relative to the plurality of sprockets, the gear shifting device including
    a chain guide configured to support the chain,
    an actuator configured to move the chain guide relative to the plurality of sprockets, and
    a controller configured to control the actuator to move the chain guide based on vehicle information relating to the human-powered vehicle.

9. The drive train according to claim 8, wherein the vehicle information includes a cadence indicating a rotational speed of the crank, and the controller is configured to control the actuator to move the chain guide based on the cadence.

10. The drive train according to claim 7, further comprising a drive unit configured to generate an assist force to rotate the hub assembly.

11. A hub assembly for a human-powered vehicle, comprising:
    a hub axle;
    a first rotatable member rotatable relative to the hub axle about a rotational center axis;
    a second rotatable member rotatable relative to the hub axle and the first rotatable member about the rotational center axis; and
    a rotation control structure coupling the first rotatable member to the second rotatable member to transmit a first input rotation of the first rotatable member to the second rotatable member at a first ratio of a first output rotation of the second rotatable member to the first input rotation of the first rotatable member,
    the rotation control structure coupling the second rotatable member to the first rotatable member to transmit a second input rotation of the second rotatable member to the first rotatable member at a second ratio of a second output rotation of the first rotatable member to the second input rotation of the second rotatable member, the second ratio being larger than 0, the second ratio being smaller than 1.

12. A hub assembly for a human-powered vehicle, comprising:
   a hub axle;
   a first rotatable member rotatable relative to the hub axle about a rotational center axis, the first rotatable member including a sprocket engagement structure configured to engage with a plurality of sprockets;
   a second rotatable member rotatable relative to the hub axle and the first rotatable member about the rotational center axis; and
   a rotation control structure coupling the first rotatable member to the second rotatable member to transmit a first input rotation of the first rotatable member to the second rotatable member at a first ratio of a first output rotation of the second rotatable member to the first input rotation of the first rotatable member,
   the rotation control structure coupling the second rotatable member to the first rotatable member to transmit a second input rotation of the second rotatable member to the first rotatable member at a second ratio of a second output rotation of the first rotatable member to the second input rotation of the second rotatable member, the second ratio being different from the first ratio, the second ratio being larger than 0, wherein
   the first ratio is 1.

13. A hub assembly for a human-powered vehicle, comprising:
   a hub axle;
   a first rotatable member rotatable relative to the hub axle about a rotational center axis, the first rotatable member including a sprocket engagement structure configured to engage with a plurality of sprockets;
   a second rotatable member rotatable relative to the hub axle and the first rotatable member about the rotational center axis; and
   a rotation control structure coupling the first rotatable member to the second rotatable member to transmit a first input rotation of the first rotatable member to the second rotatable member at a first ratio of a first output rotation of the second rotatable member to the first input rotation of the first rotatable member,
   the rotation control structure coupling the second rotatable member to the first rotatable member to transmit a second input rotation of the second rotatable member to the first rotatable member at a second ratio of a second output rotation of the first rotatable member to the second input rotation of the second rotatable member, the second ratio being different from the first ratio, the second ratio being larger than 0, wherein
   the rotation control structure includes a first one-way clutch provided between the first rotatable member and the second rotatable member to transmit the first input rotation of the first rotatable member to the second rotatable member at the first ratio,
   the first one-way clutch is provided between the first rotatable member and the second rotatable member to restrict the first rotatable member to rotate relative to the second rotatable member about the rotational center axis in a first rotational direction, and
   the first one-way clutch is provided between the first rotatable member and the second rotatable member to allow the first rotatable member to rotate relative to the second rotatable member about the rotational center axis in a second rotational direction which is an opposite direction of the first rotational direction.

14. The hub assembly according to claim 13, wherein the second ratio during coasting is different from the first ratio.

15. A hub assembly for a human-powered vehicle, comprising:
   a hub axle;
   a first rotatable member rotatable relative to the hub axle about a rotational center axis, the first rotatable member including a sprocket engagement structure configured to engage with a plurality of sprockets;
   a second rotatable member rotatable relative to the hub axle and the first rotatable member about the rotational center axis; and
   a rotation control structure coupling the first rotatable member to the second rotatable member to transmit a first input rotation of the first rotatable member to the second rotatable member at a first ratio of a first output rotation of the second rotatable member to the first input rotation of the first rotatable member,
   the rotation control structure coupling the second rotatable member to the first rotatable member to transmit a second input rotation of the second rotatable member to the first rotatable member at a second ratio of a second output rotation of the first rotatable member to the second input rotation of the second rotatable member, the second ratio being different from the first ratio, the second ratio being larger than 0, wherein
   the rotation control structure includes a first one-way clutch provided between the first rotatable member and the second rotatable member to transmit the first input rotation of the first rotatable member to the second rotatable member at the first ratio, and
   the first one-way clutch includes
      a first receiving surface provided at one of the first rotatable member and the second rotatable member, and
      a first contactable surface configured to contact the first receiving surface to transmit the first input rotation of the first rotatable member to the second rotatable member at the first ratio.

16. A hub assembly for a human-powered vehicle, comprising:
   a hub axle;
   a first rotatable member rotatable relative to the hub axle about a rotational center axis, the first rotatable member including a sprocket engagement structure configured to engage with a plurality of sprockets;
   a second rotatable member rotatable relative to the hub axle and the first rotatable member about the rotational center axis; and
   a rotation control structure coupling the first rotatable member to the second rotatable member to transmit a first input rotation of the first rotatable member to the second rotatable member at a first ratio of a first output rotation of the second rotatable member to the first input rotation of the first rotatable member,
   the rotation control structure coupling the second rotatable member to the first rotatable member to transmit a second input rotation of the second rotatable member to the first rotatable member at a second ratio of a second output rotation of the first rotatable member to the second input rotation of the second rotatable member, the second ratio being different from the first ratio, the second ratio being larger than 0, wherein the rotation control structure includes a ring gear, a sun gear, and at least one planetary gear engaged with the ring gear and the sun gear to transmit the second input rotation of the second rotatable member to the first rotatable member at the second ratio, the ring gear is rotatable relative to the hub axle, the first rotatable member, and the second rotatable member about the rotational center axis, the sun gear is coupled to the second rotatable member to rotate along with the second rotatable member relative to the hub axle and the first rotatable member, the at least one planetary gear is provided between the sun gear and the ring gear to transmit a rotation of the ring gear to the sun gear at the second ratio.

17. The hub assembly according to claim 16, wherein the rotation control structure includes a second one-way clutch provided between the hub axle and the ring gear to allow the ring gear to rotate relative to the hub axle in a first rotational direction and to restrict the ring gear from rotating relative to the hub axle about the rotational center axis in a second rotational direction which is an opposite direction of the first rotational direction.

18. The hub assembly according to claim 17, wherein the second one-way clutch includes
   a second receiving surface provided at one of the hub axle and the ring gear, and
   a second contactable surface configured to contact the second receiving surface to restrict the ring gear from rotating relative to the hub axle about the rotational center axis in the second rotational direction.

19. A hub assembly for a human-powered vehicle, comprising:
   a hub axle;
   a first rotatable member rotatable relative to the hub axle about a rotational center axis, the first rotatable member including a sprocket engagement structure configured to engage with a plurality of sprockets;
   a second rotatable member rotatable relative to the hub axle and the first rotatable member about the rotational center axis; and
   a rotation control structure coupling the first rotatable member to the second rotatable member to transmit a first input rotation of the first rotatable member to the second rotatable member at a first ratio of a first output rotation of the second rotatable member to the first input rotation of the first rotatable member, the rotation control structure coupling the second rotatable member to the first rotatable member to transmit a second input rotation of the second rotatable member to the first rotatable member at a second ratio of a second output rotation of the first rotatable member to the second input rotation of the second rotatable member, the second ratio being different from the first ratio, the second ratio being larger than 0, wherein the rotation control structure includes a ring gear, a sun gear, and at least one planetary gear engaged with the ring gear and the sun gear to transmit the second input rotation of the second rotatable member to the first rotatable member at the second ratio, and the at least one planetary gear is rotatably coupled to the first rotatable member.

20. A hub assembly for a human-powered vehicle,
   a hub axle;
   a first rotatable member rotatable relative to the hub axle about a rotational center axis, the first rotatable member including a sprocket engagement structure configured to engage with a plurality of sprockets;
   a second rotatable member rotatable relative to the hub axle and the first rotatable member about the rotational center axis; and
   a rotation control structure coupling the first rotatable member to the second rotatable member to transmit a first input rotation of the first rotatable member to the second rotatable member at a first ratio of a first output rotation of the second rotatable member to the first input rotation of the first rotatable member, the rotation control structure coupling the second rotatable member to the first rotatable member to transmit a second input rotation of the second rotatable member to the first rotatable member at a second ratio of a second output rotation of the first rotatable member to the second input rotation of the second rotatable member, the second ratio being different from the first ratio, the second ratio being larger than 0, wherein the second ratio is smaller than 0.5.

* * * * *